United States Patent [19]

Cheeseboro

[11] Patent Number: 4,523,305
[45] Date of Patent: * Jun. 11, 1985

[54] MAGNETICALLY RECORDABLE LABEL FOR MECHANICALLY-DEFINED INFORMATION-BEARING DISCS

[76] Inventor: Robert G. Cheeseboro, 3525 S. Bronson Ave., Los Angeles, Calif. 90018

[ * ] Notice: The portion of the term of this patent subsequent to Dec. 27, 2000 has been disclaimed.

[21] Appl. No.: 562,853

[22] Filed: Dec. 19, 1983

Related U.S. Application Data

[60] Continuation-in-part of Ser. No. 322,948, Nov. 19, 1981, Pat. No. 4,423,503, which is a continuation-in-part of Ser. No. 164,922, Jul. 1, 1980, Pat. No. 4,302,832, which is a division of Ser. No. 951,563, Oct. 16, 1978, Pat. No. 4,222,574, which is a division of Ser. No. 778,027, Mar. 16, 1977, Pat. No. 4,121,836.

[51] Int. Cl.³ .................................................. G11B 3/68
[52] U.S. Cl. ........................................ 369/33; 369/41; 369/272; 369/290; 369/292
[58] Field of Search .................. 369/33, 41, 272, 290, 369/292

[56] References Cited

U.S. PATENT DOCUMENTS

| | | | |
|---|---|---|---|
| 1,641,136 | 8/1927 | Dorn | 369/264 |
| 2,536,922 | 1/1951 | Durbrow | 369/290 |
| 3,123,361 | 3/1964 | Trott | 369/55 |
| 3,183,004 | 5/1965 | Miessner | 369/56 |
| 3,264,003 | 8/1966 | Thevenaz | 369/75.2 |
| 3,493,232 | 2/1970 | Tatter et al. | 369/187 |
| 3,503,615 | 3/1970 | Matsuda | 369/33 |
| 3,506,269 | 4/1970 | Hannah | 369/41 |
| 3,658,347 | 4/1972 | Cheeseboro | 369/77.1 |
| 3,662,363 | 5/1972 | Chertak | 369/41 |
| 3,838,861 | 10/1974 | Hammond et al. | 369/230 |
| 3,990,710 | 11/1976 | Hughes | 369/34 |
| 4,093,832 | 6/1978 | Isaacson et al. | 369/33 |
| 4,142,729 | 3/1979 | McLennan | 369/33 |
| 4,199,820 | 4/1980 | Ohtake et al. | 369/41 |
| 4,230,323 | 10/1980 | Tsuji et al. | 369/33 |

*Primary Examiner*—Steven L. Stephan
*Attorney, Agent, or Firm*—Christie, Parker & Hale

[57] ABSTRACT

There is described, among other things, an accessory for a phonograph record disc which has a center hole axially of a label portion of the disc. The accessory comprises a sheet which is of circular annular shape and has a diameter not substantially greater than the disc label portion. One side of the sheet carries adhesive for affixing the sheet to the label portion of the record concentric to its center hole. The opposite side of the sheet carries an annular band which is positioned concentric to the center of the sheet. The annular band is defined by a magnetic recording medium. The magnetic recording medium facilitates the placement of information on the record disc which can be read and used by a programmable record player.

The invention also describes a phonograph record having a central label portion and a circular hole through its axis. The record includes a band of magnetic recording medium affixed to the label portion concentric to the hole.

4 Claims, 31 Drawing Figures

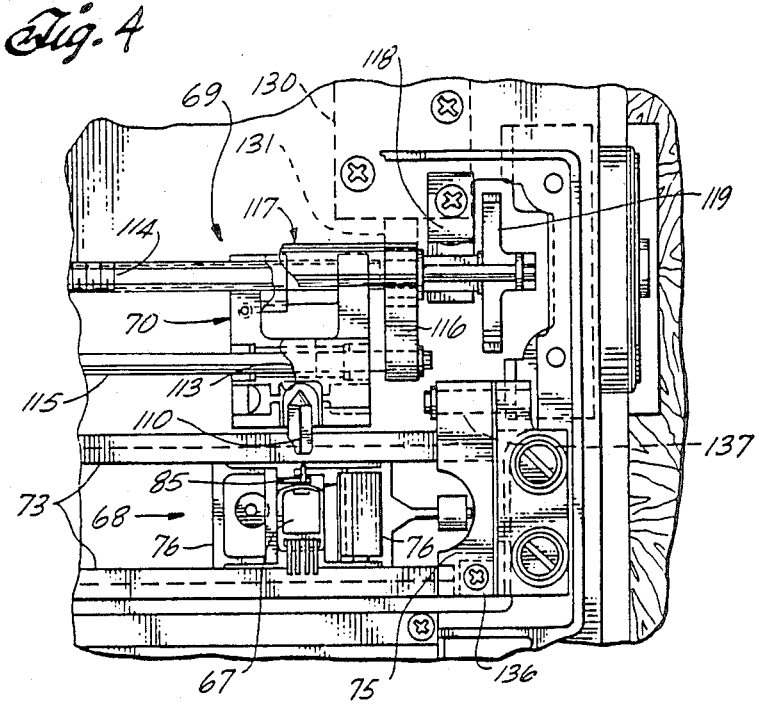
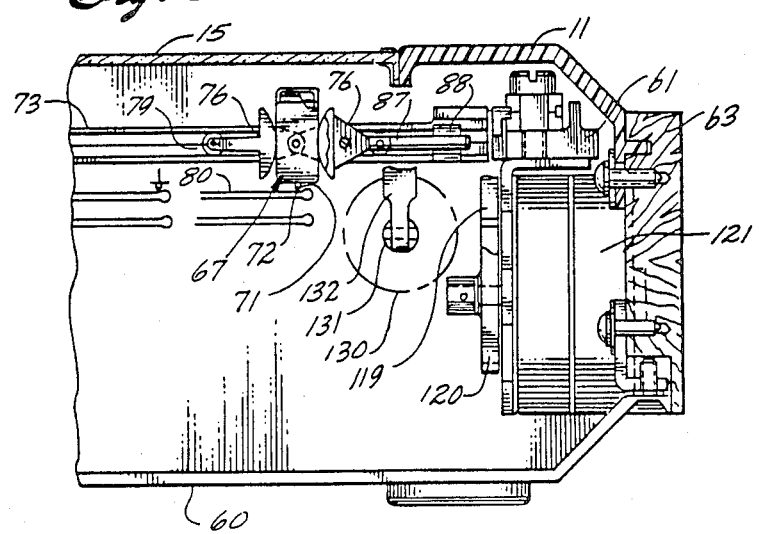

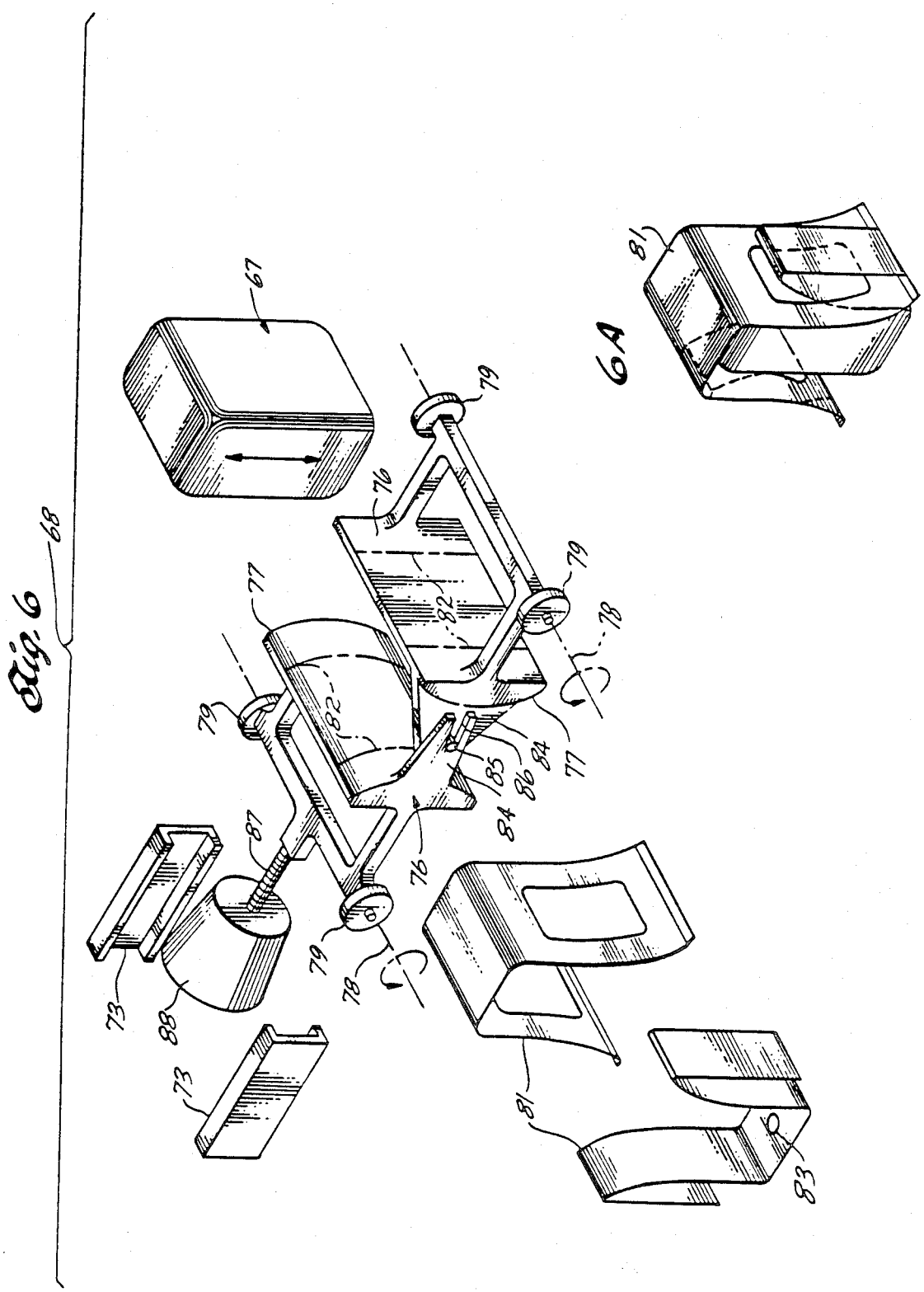

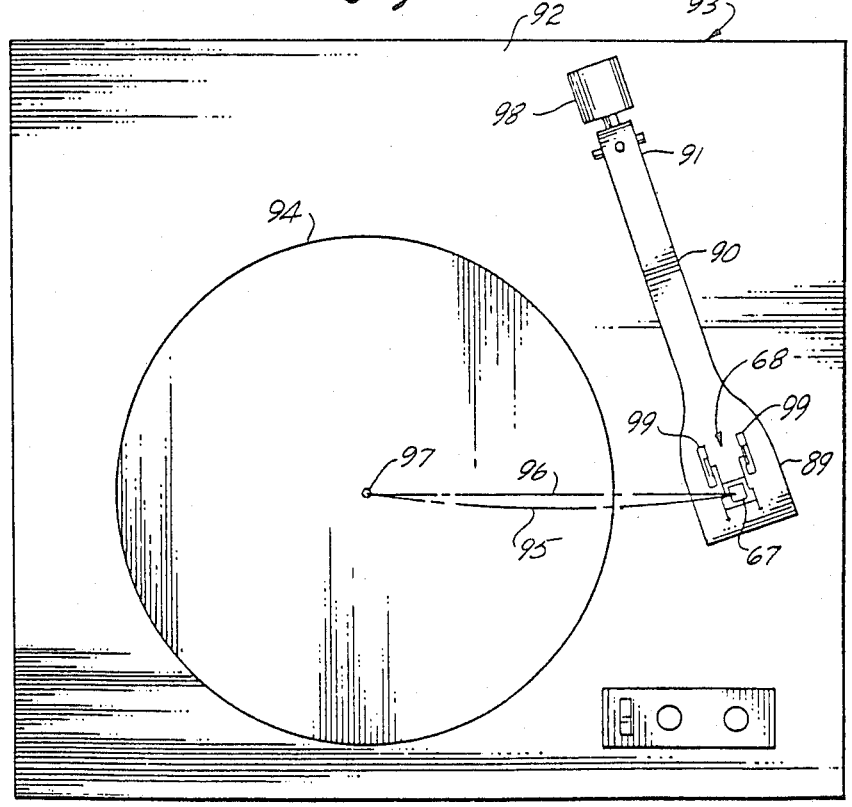
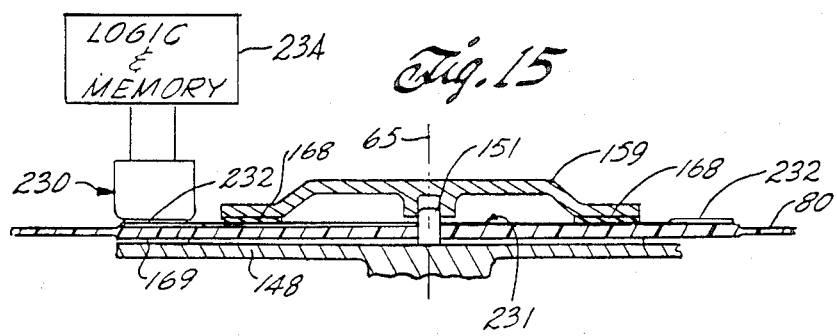

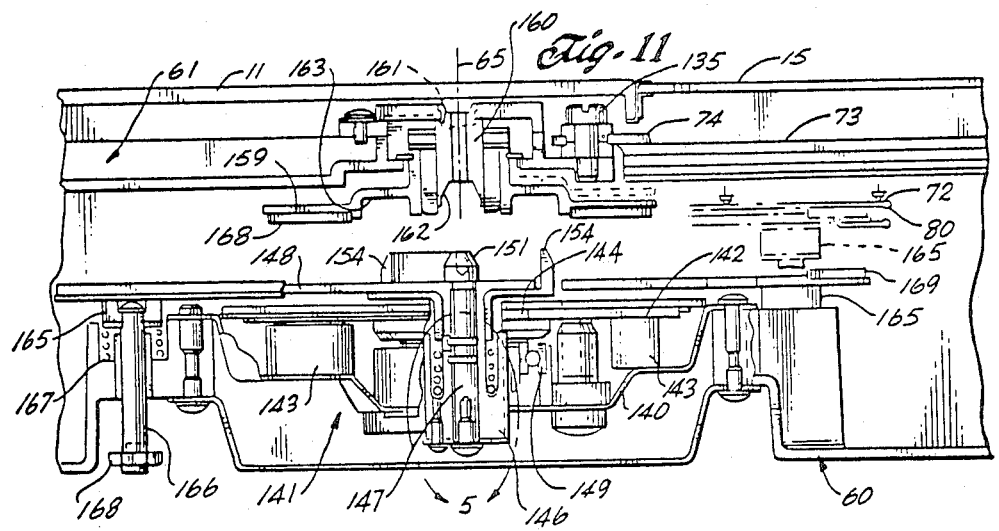
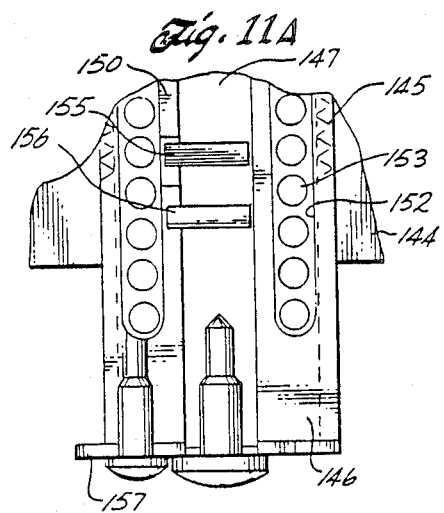

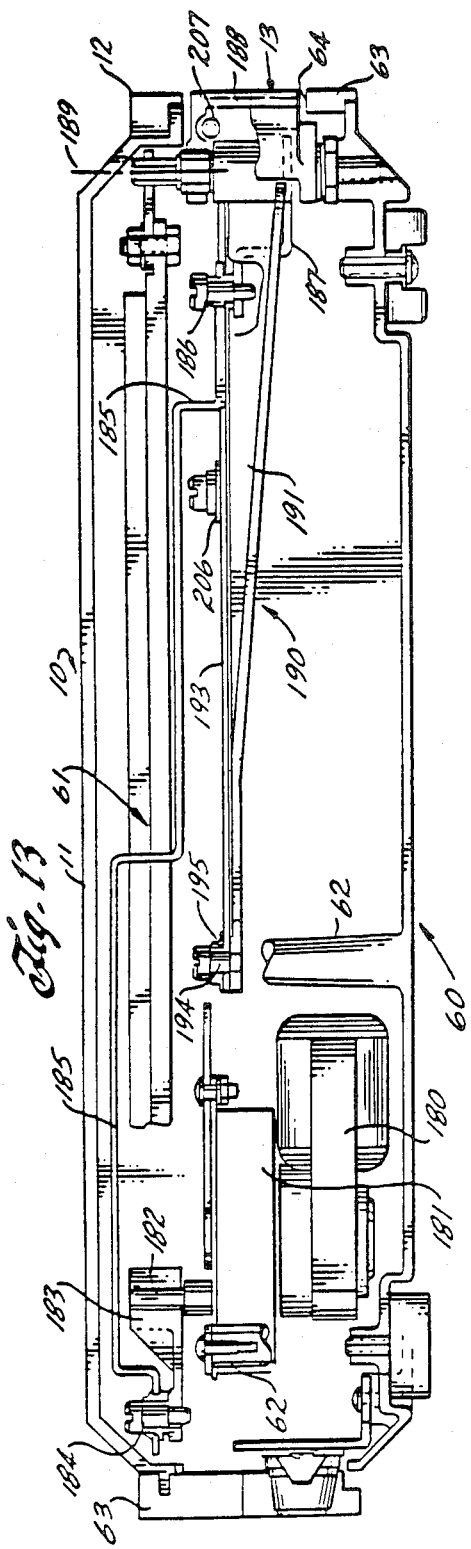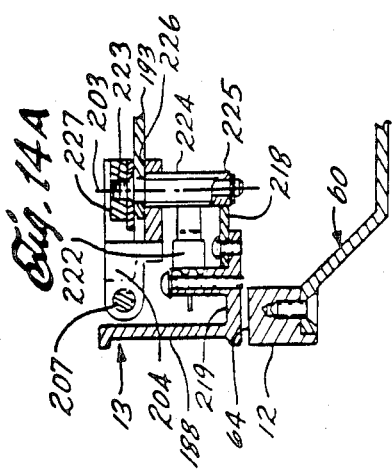

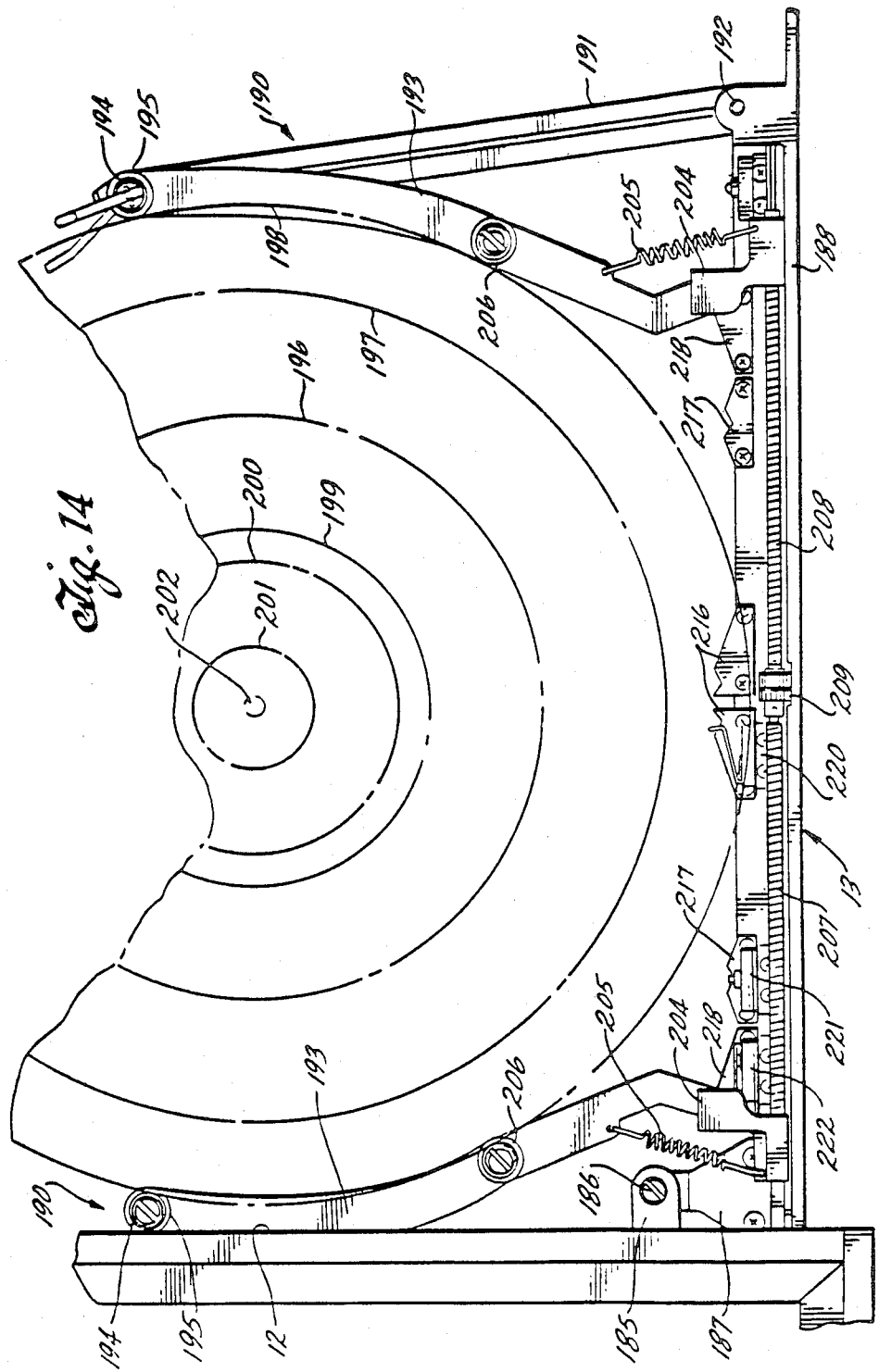

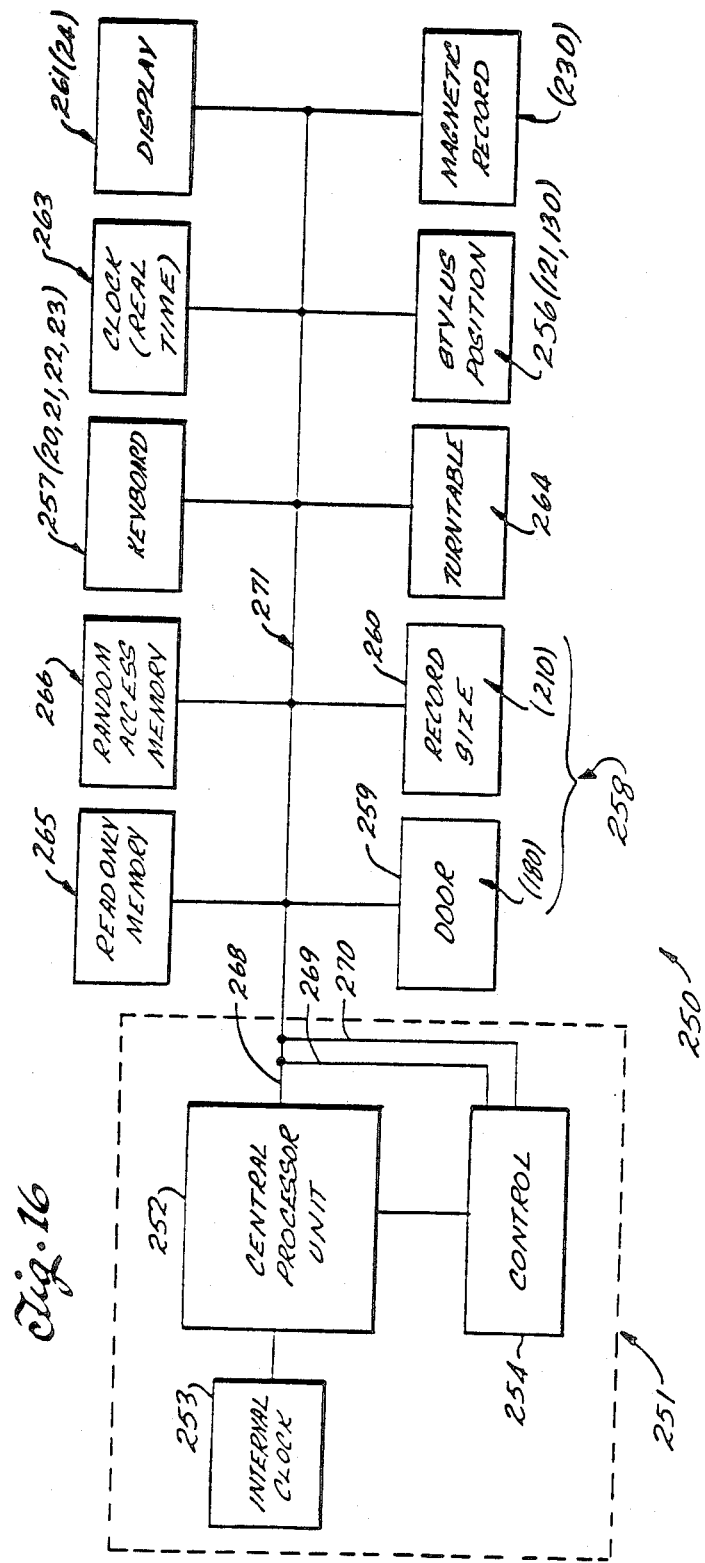

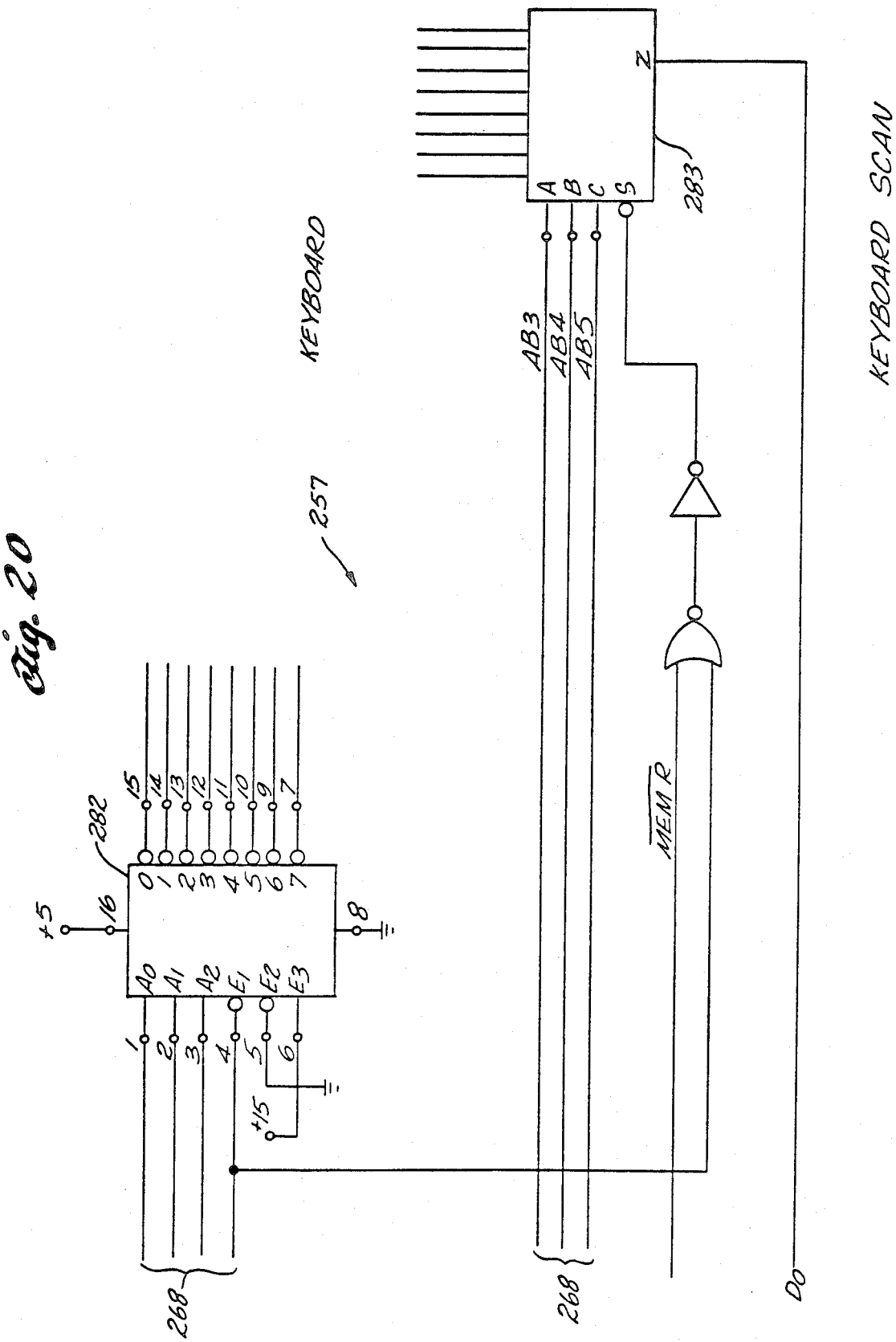

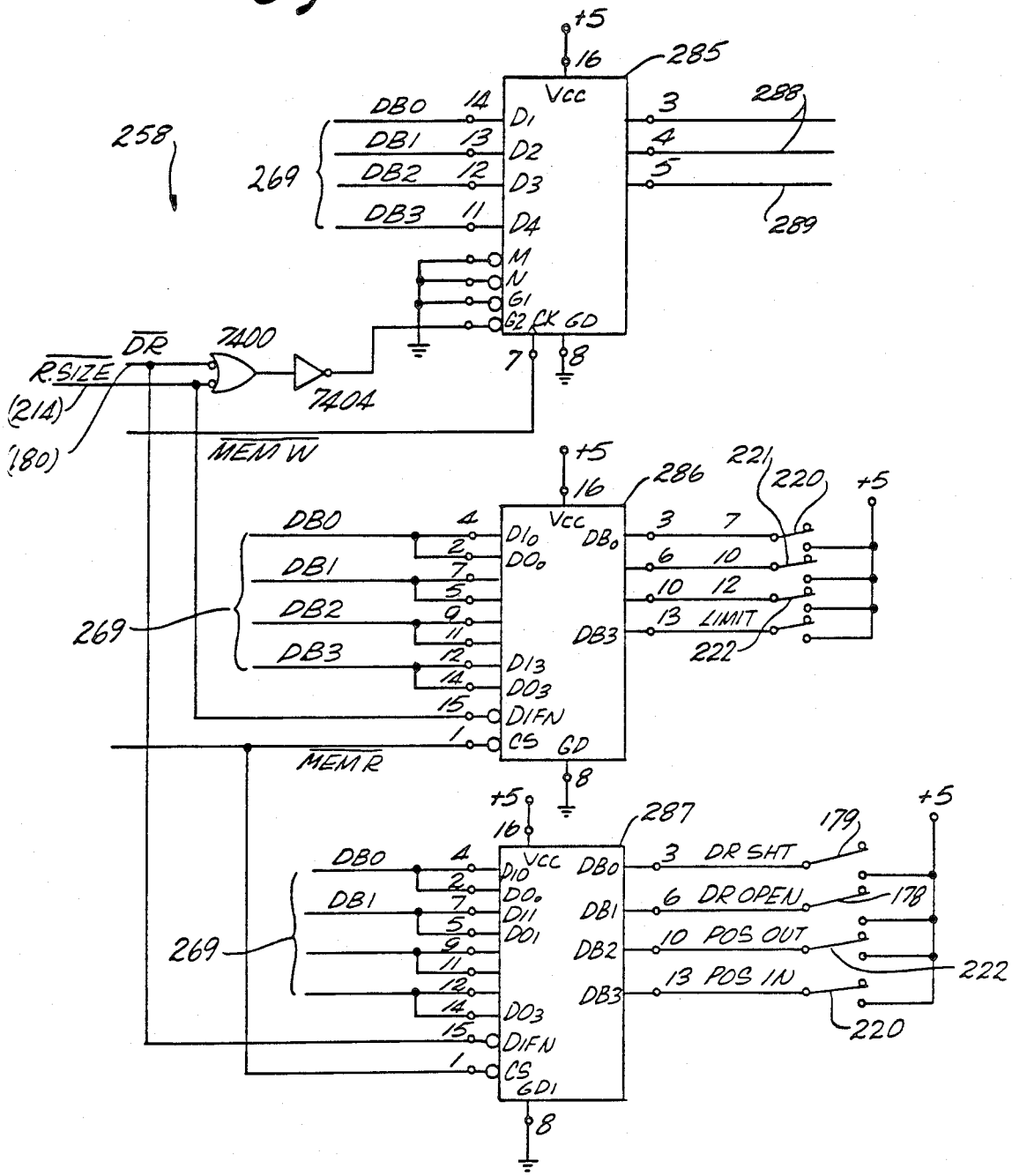

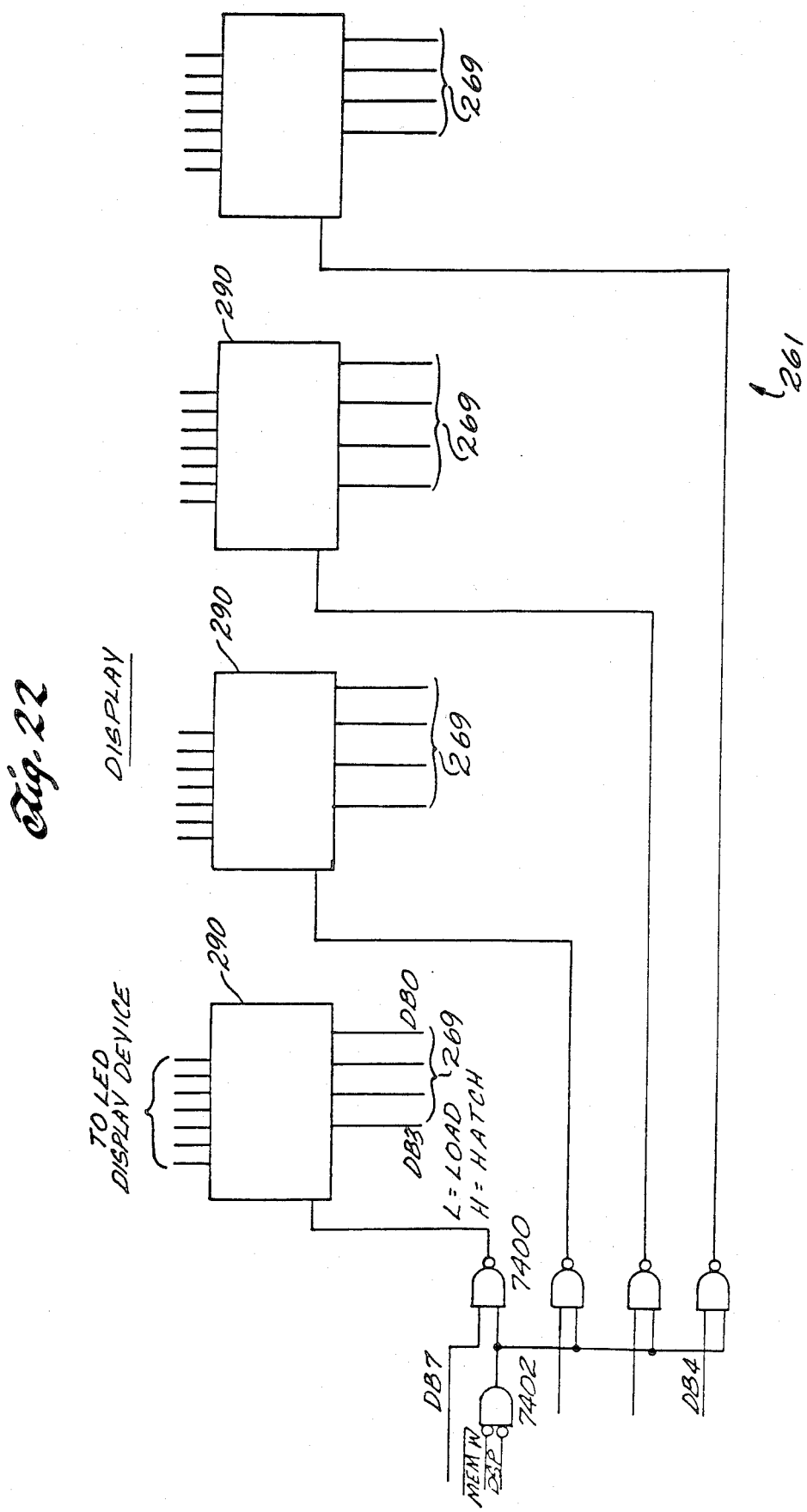

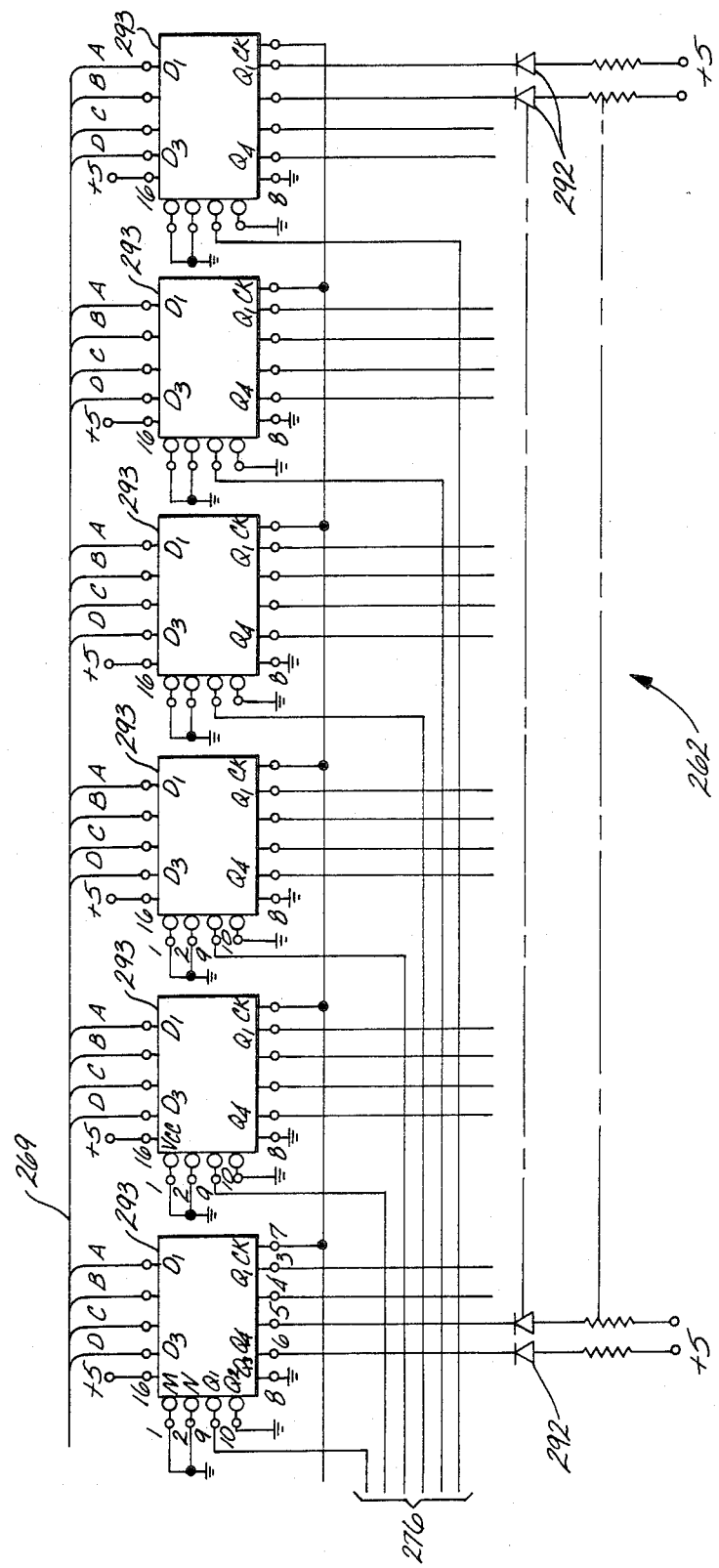

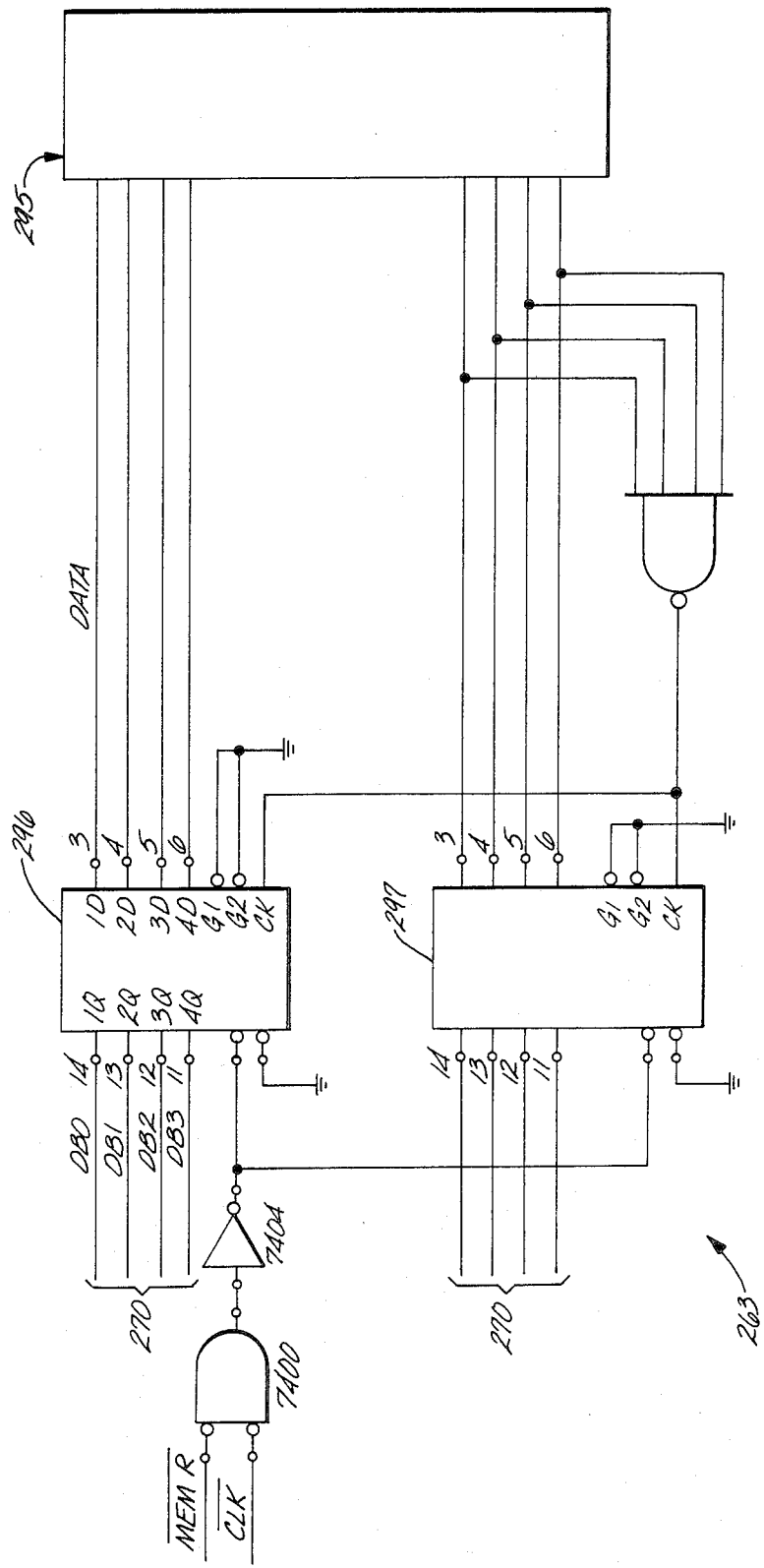

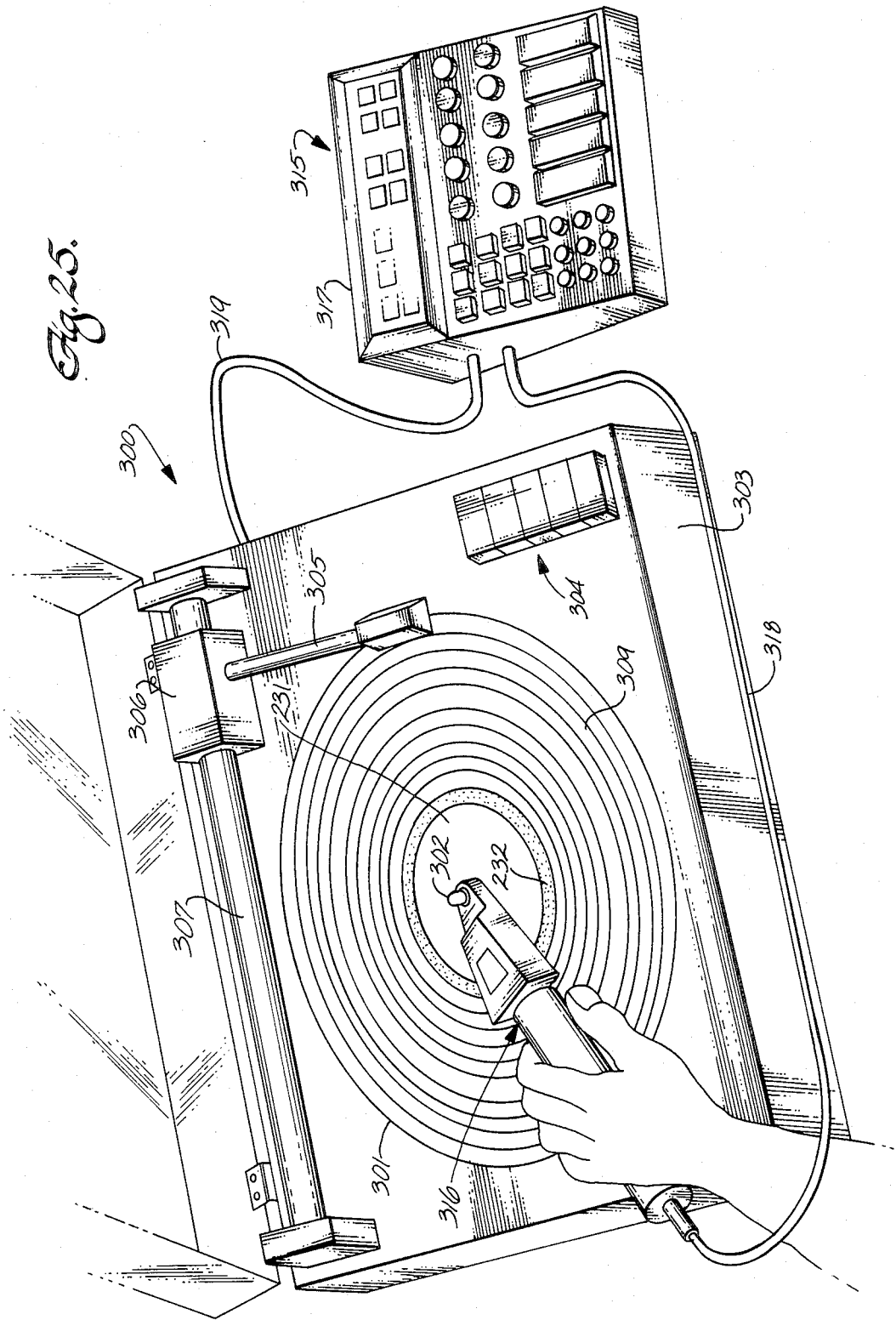

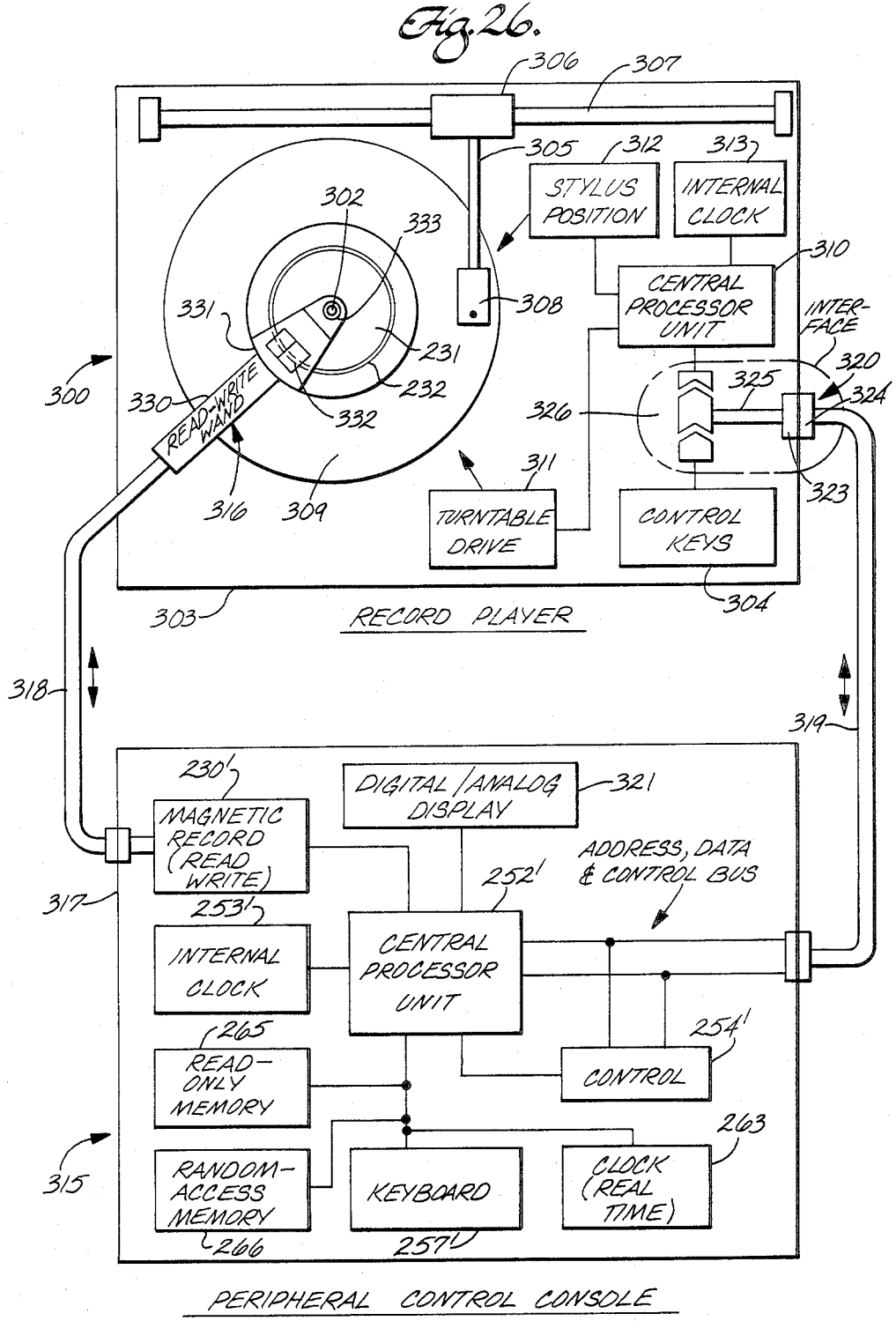

MAGNETICALLY RECORDABLE LABEL FOR MECHANICALLY-DEFINED INFORMATION-BEARING DISCS

CROSS-REFERENCE TO RELATED APPLICATIONS AND PATENTS

This application is a continuation-in-part of my prior copending application Ser. No. 322,948 filed Nov. 19, 1981, now U.S. Pat. No. 4,423,593 issued Dec. 27, 1983. Application Ser. No. 322,948 was a continuation-in-part of, and was copending with application Ser. No. 164,922 filed July 1, 1980 and which is now U.S. Pat. No. 4,302,832 issued Nov. 24, 1981. Application Ser. No. 164,922 was a division of and was copending with application Ser. No. 951,563 filed Oct. 16, 1978, and which is now U.S. Pat. No. 4,222,574 issued Sept. 16, 1980. Application Ser. No. 951,563 was a division of and was copending with application Ser. No. 778,027 filed Mar. 16, 1977 and which is now U.S. Pat. No. 4,121,836 issued Oct. 24, 1978.

BACKGROUND OF THE INVENTION

1. Field of the Invention

This invention relates to record players, i.e., to equipment useful with a phonograph record disc to sense by a stylus, and to convert by a transducer to an electrical signal, audio information contained in the contours of the spiral groove defined in the disc. More particularly, it relates to a programmable record player in which the stylus moves across a record disc along a line radially of the disc axis of rotation and in which the transducer cartridge, to which the stylus is mounted, is carried on a novel suspension which enables substantially zero tracking force to be achieved between the stylus and the record disc and which, apart from the overall radial-tracking movement, constrains the cartridge to move without change in the tracking force only perpendicular to the disc's plane of rotation under loads imposed on the stylus by the record.

2. Review of the Prior Art

My prior U.S. Pat. No. 3,658,347 describes a record player in which a phonograph record disc, during playing of the record when a stylus is engaged in the record's spiral groove, is held captive between a driven record supporting turntable below the record and a clamp disc above the record. The stylus is carried by a transducer cartridge which is mounted in a carriage located above the record. The carriage is supported on rollers engaged in rails so disposed that the path of movement of the stylus, overall across the record, is along a line parallel to and radially of the record.

The advantages of radial-tracking record players, as compared to record players in which the stylus and the cartridge are mounted on the end of a long pivoted tone arm, is that the stylus path of movement across the record corresponds to the path of movement traversed by the cutting head of the lathe used to define the master record of which the usual commercially available record is a replica. Thus, in theory, a radial-tracking record player better reproduces the sounds defined in the contours of the walls of the spiral groove of the record.

Virtually all phonograph records now produced, regardless of size, are manufactured to reproduce stereophonic sound. In the cutting of the masters from which the records are reproduced, the cutting tool of the master cutting lathe moves in the cutting head only normal to the master disc (to produce variations in groove depth) and from side-to-side radially of the master disc (to produce local variations in the contour of the groove sidewalls defining the actual audio information); the overall spiral pattern of the groove is generated in the master disc by controlled movement of the lathe cutting head radially of the master disc's axis of rotation.

Thus, to optimally reproduce the sounds received in a phonograph record, a record player should limit the motions of the pickup stylus to only those motions which are experienced by the cutting tool used to cut the master disc. Also, the stylus should be mounted in the record player so that it can accommodate these limited motions without any variation in the force with which the stylus engages the record groove. The present record player accomplishes this optimum result significantly better than is the case of record players according to my prior patent, and also better than is the case in other radial-tracking record players now commercially available.

Radial-tracking record players are now commercially available and are marketed in the United States and elsewhere under the tradenames Bank & Olufsen and Rabco, among others. All of these record players mount the stylus and cartridge on the end of an elongate tone arm which is hinged at its other end for rotation of the arm at least in a plane perpendicular to the plane of rotation of a record engaged by the stylus. This is done to enable the stylus and cartridge to move vertically to follow warpage which is common in mass-produced phonograph records. Such hinging of the tone arm enables the stylus to have a freedom of motion not permitted to the cutting tool in the manufacture of the master disc; to at least this extent, these other radial-tracking record players depart from the optimum tracking characteristics described above. The present record player does not afford this additional mode of motion to the stylus and cartridge. The other radial-tracking record players mentioned above suffer from additional disadvantages which are overcome in the present record player.

SUMMARY OF THE INVENTION

This invention provides a radial-tracking record player in which the stylus better conforms to the optimum tracking characteristics described above. The instantaneous motions of the stylus during playing of a record are limited to side-to-side motions in the record groove and to only linear motion of the stylus and its supporting transducer cartridge along a line perpendicular to the record plane of rotation. The stylus is enabled to conform to warpage of a record with greatly reduced variation, if any, in the force with which the stylus engages the record. These advantages are produced by a novel cartridge suspension mechanism in the present record player.

These advantages preferably are embodied in a record player which includes many of the advantages and features of the record player described in my prior U.S. Pat. No. 3,658,347. Thus, the preferred embodiment of the present record player requires only that the user place a record on receiving supports and actuates a control button to command the player to PLAY the record; thereafter, the record is handled automatically by the player and brought into engagement with the stylus. During playing of the record, it is fully enclosed in the record player and is protected from damage.

Also, the preferred embodiment of the present record player includes a programmable control arrangement which gives a user heretofore unavailable operating choices and control over which passages on a record will be played in any sequence desired. That is, the record player enables a user to select the precise beginning and end points of a recorded passage of interest, to repeat the playing of the passage any number of times desired, and to play desired passages in any sequence desired, even a sequence different from the sequence defined in the phonograph record. Commands for such operations may be entered into the record player manually by the user at the time of playing a particular record, or the necessary commands may be recorded on the record itself for use later when it is actually desired to play the record; the latter feature is believed to be of great benefit to radio stations and the like.

This invention, as set forth in the appended claims, provides an accessory for a phonograph record disc having a center hole axially at the label portion of the disc. The accessory comprises a sheet which is affixable to the label portion of the record concentric to the center hole. The sheet is of circular annular shape having a diameter not substantially greater than the disc label portion. One side of the sheet carries adhesive for affixing the sheet to the label portion of the record. The opposite side of the sheet carries an annular band defined by a magnetic recording medium which is concentric to the center of the sheet. Preferably, the sheet is substantially transparent inwardly of the annular band.

In another aspect, the invention comprises a phonograph record having a central label portion and a circular hole through its axis. The record includes the provision of a band of magnetic recording medium affixed to the record label portion concentric to the hole.

DESCRIPTION OF THE DRAWINGS

The above-mentioned and other features of this invention are more fully set forth in the following detailed description of the presently preferred embodiment of the record player and of alternative embodiments of certain aspects of the record player, which description is presented with reference to the accompanying drawings, wherein:

FIG. 4 is a fragmentary plan view, partially in section, of the cartridge suspension in its preferred form;

FIG. 5 is an elevation view, partially in section, of the cartridge suspension mechanism;

FIG. 6 is a perspective exploded view of the components of the transducer cartridge suspension mechanism;

FIG. 6A is a perspective view of the flexible strap arrangement used in the suspension shown in FIG. 6 to hold the cartridge in place;

FIG. 9 is a simplified plan view showing the stylus suspension mechanism illustrated in FIGS. 4-7 embodied in a record player or more conventional configuration than that shown in FIG. 1;

FIG. 11 is a cross-section view of the turntable, turntable drive motor and record clamp disc employed in the presently preferred record player;

FIG. 11A is an enlarged cross-section view of a portion of the structure shown in FIG. 11;

FIG. 13 is a cross-sectional elevation view, with some elements broken away, taken generally along line 13—13 in FIG. 3;

FIG. 14 is a top plan view of the door of the record player of FIG. 1 shown in its open position, and of the record support arms carried thereby;

FIG. 14A is a cross-section view taken along line 14A—14A in FIG. 3;

FIG. 15 is a simplified cross-sectional elevation view showing the relationship between the magnetic read-and-write head in the presently preferred record player, and a record disposed in its playing position;

FIG. 16 is a simplified overall block diagram of the programmable control system for the present preferred record player; and FIGS. 17-24 are schematic and logic block diagrams of individual components and subsystems of the overall system shown in FIG. 16, in which:

FIG. 17 pertains to the central processor unit;

FIG. 18 pertains to the address decode subsystem;

FIG. 19 pertains to the stylus position sensing and control subsystem;

FIG. 20 pertains to the keyboard scanning subsystem;

FIG. 21 pertains to the door and record size subsystems;

FIG. 22 pertains to the display subsystem;

FIG. 23 pertains to the subsystem concerned with lighting of the control panel for the purposes of instructing the user how to correctly program the record player;

FIG. 24 pertains to the real-time clock subsystem;

FIG. 25 is a perspective view of a radial-tracking record player equipped with a peripheral control unit, including a magnetic read/write wand assembly, which adds to the record player substantial advanced control features of this invention, which features include the ability to control operation of the record player by use of data recorded magnetically in an overlay applied to the label area of a record in the record player; and FIG. 26 is a depiction, partially in block diagram form and partially in mechanical schematic form, of the control and functional elements of the equipment shown in FIG. 25.

DESCRIPTION OF THE ILLUSTRATIVE EMBODIMENTS

Figure 1:
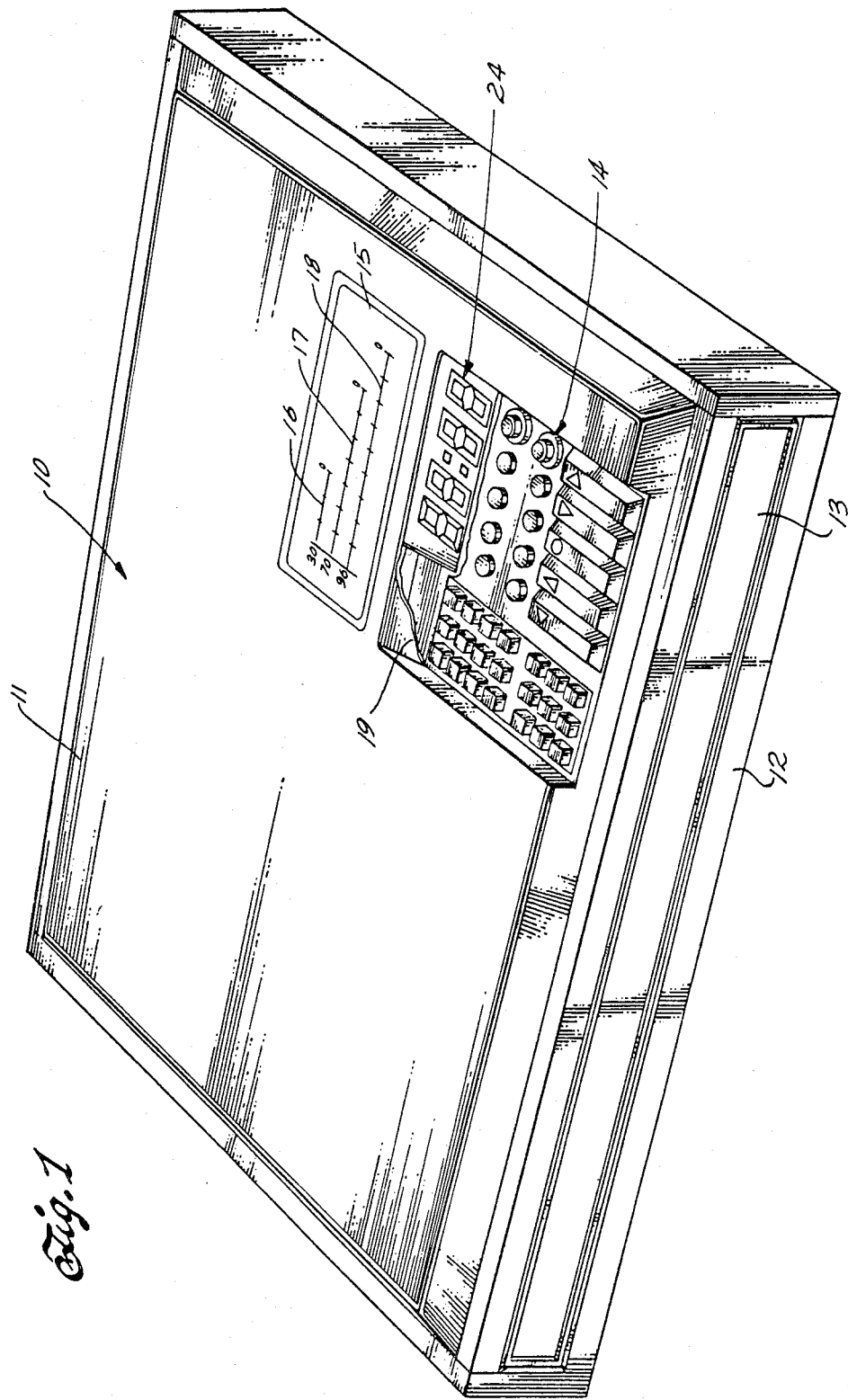
FIG. 1 is a perspective of the presently preferred record player according to this invention.

FIG. 1 is a perspective view of a programmable radial-tracking record player 10 which is the presently preferred record player according to this invention. Record player 10 has overall dimensions of 3⅛ inches high by 17 inches wide by 13 inches deep. The top of the record player is defined by a cover 11 which is normally not openable by a user during operation of the record player. Instead, access to the interior of the record player, for the purpose of inserting a phonograph thereinto, is obtained via an openable door 13 which is incorporated in the front face 12 of the record player and which is shown in its closed position in FIG. 1. Preferably the cover 11 of record player 10 is defined of a smoked plastic material which appears to resemble obsidian or polished ebony at a distance, but which, from a close viewing position, enables an observer to see into the interior of the record player.

Figure 2:
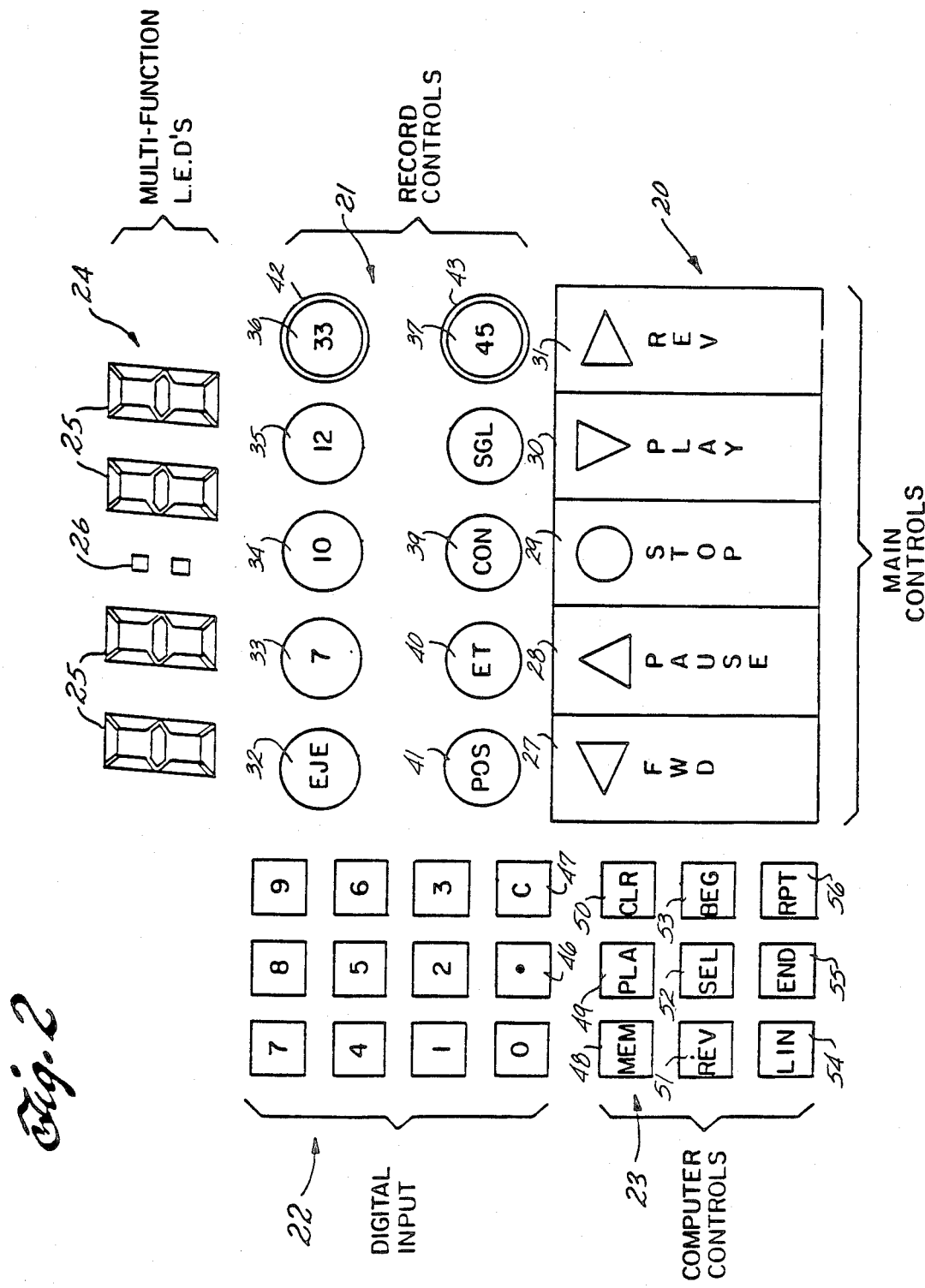
FIG. 2 is a chart showing the control and data display portion of the record player illustrated in FIG. 1.

A control and operating panel 14 is located in the lower right quadrant of the cover 11, and is shown in greater detail in FIG. 2. A transparent window 15 is provided through the cover immediately across the top of control panel 14, and is located generally above the path of movement of the stylus and its transducer cartridge radially of the axis of the turntable of the record player. The record player is constructed to play records of 7 inch, 10 inch or 12 inch diameter. Corresponding scales 16, 17 and 18 are carried by window 15 to enable the user to visually follow and determine the position of the stylus at any time across the width of the playing (audio information carrying) portion of the spiral groove of a record in the record player between the run-in and run-out portions of the groove. The relationship between the above-described externally visible features of record player 10 and its internal, normally inaccessible mechanisms will be apparent from the following description.

In the vicinity of control panel 14, the cover is recessed, as at 19, and suitable openings are provided through the bottom of the recess to enable projection into the recess of the pushbutton portions of the control command and data input switches which are all mounted on a common support in the record player below the recess. The display devices shown in FIG. 1 as part of display section 24 of control panel 14 are actually mounted below the cover, to be visible through the cover when illuminated, and this is shown by the content of FIG. 1.

As shown in FIG. 2, which is a chart showing the general organization and graphic detail of control panel 14, the control panel is functionally divided into a main control section 20, a record control section 21, a digital input section 22, a computer control section 23, and a visual display section 24. The latter section preferably is composed of four seven-segment light-emitting diode displays 25 arranged in pairs on either side of a two-element light-emitting diode 26 in which the elements are arranged in the form of a colon.

The various sections of control panel 14 adapt record player 10 for use by radio station studio personnel, for example. Existing radio station audio programming equipment requires multiple operating modes, and have controls which at first appear complex. It is believed that a principal utility of record player 10, in which such operating modes and controls are simplified, will be by broadcast studio personnel. In broadcast studios, under the pressure of real-time conditions associated with live radio or television broadcasts, the workload on a studio technician can be very high. Record player 10 uses dual interlocking approaches to alleviate this workload. In record player 10, the selection and scheduling chores, i.e., the decisions as to which bands to play from various records, can be performed in advance of the actual broadcast. Second, a microprocessor contained within record player 10, described in greater detail below with reference to FIGS. 16-24, handles much of the operational logic and decision-making process by, in effect, instructing the user to first do this and then do that. Band selection, either from a multiband phonograph record or of a selected passage from a single-band recording such as a symphony, can be determined precisely by reference to the digital display and readout section 24 of control panel 14 which, via the radial-tracking mechanism in the record player, is operable to display the position of the stylus on a record with an accuracy of about 0.02 millimeter. This information also contributes indirectly to servo speed control of the low-inertia, printed-circuit turntable drive motor which is described below with reference to FIG. 11. Because selection information is always related to a particular record, one aspect of this invention involves an annular magnetic tape affixed to the periphery of a record label; see the following description pertinent to FIG. 15. Programming instructions peculiar to a given record can be encoded and recorded on the record itself in a form which is capable of being changed at a later date, if desired.

Apart from numbers storage and processing, the microprocessor, i.e., computer, within the record player also handles logic functions through a read-only memory associated with the computer. The effect, from the point of view of the user, is an "optical guided tour" through what would be an operating manual for the record player. This is accomplished through the medium of lights associated with the pushbuttons and other controls in sections 20, 21 and 23 of control panel 14. Improper commands entered into the record player by a user are defeated, and the next proper command is indicated as the appropriate control button is illuminated in the proper sequence. The graphic information associated with the various control buttons illustrated in FIG. 2 comprise the complete instruction set for record player 10. It should be evident from an examination of FIG. 2, however, that a user of record player 10 may choose not to use the various control options afforded, and to employ three or so pushbuttons to operate record player 10 in a manner analogous to the mode of operation of an existing basic record player. However, potentially complex programming operations are simplified by the functional organization of the components of control panel 14. For example, if a recorded sound background, used in a radio broadcast, is required to end precisely with the last second of a spoken passage by an announcer, only one previous playing of the desired band of the record is required to program the record player for automatic starting at precisely the desired point on the record of interest.

The foregoing general remarks concerning the features, benefits and advantages afforded by control panel 14 will be apparent from the following brief description of the individual controls and the functions which they regulate or initiate in record player 10.

Main control section 20 of the control panel includes five independently illuminated pushbuttons which are the principal control elements of the record player. These main controls are:

a forward (FWD) control 27 which, when operated, causes the stylus to be lifted from a record and the stylus to be traversed at high speed toward the center of the record, and which, when released, causes play of the record to be resumed by lowering of the stylus at that point into engagement with the record;

a PAUSE control 28 which, when operated, causes the stylus to be lifted from the record and to be held in that position relative to the center of the record, stops the accumulation of a count within the record player indicative of the position of the stylus relative to the turntable axis, stops an elapsed time accumulation, and enables a random access memory within the microprocessor for programming, i.e., appropriate data insertion;

A STOP control 29 which, when operated, causes the stylus to be lifted from the record, reverses the turntable drive motor to cause the turntable to lower along its axis of rotation and then to shut off the turntable motor and all power within the unit, except power to a real-time clock, after which event the display portion 24 of the control panel displays the actual time-of-day in hours and minutes and, with the flashing colon 26, seconds, by actuation of a real-time clock associated with the digital display section of the control panel;

A PLAY control 30 which, when operated, causes loading door 13 to close, the turntable drive motor to be operated to lift the turntable along its axis of rotation and thereafter to be rotated at a selected speed, and to play the record either in a normal manner or as instructed by operation of other components of the control panel; and a reverse (REV) control 31 which, when depressed, causes the stylus to be lifted from the record and to be traversed at high speed in a direction away from the turntable axis of rotation to a starting position, and which, when released, causes play of the record to be resumed.

Record control section 21 of the control panel includes ten separately illuminated pushbuttons, which either implement commands or perform functions within the record player related to a particular record being played or augment the commands and functions associated with the main control section. The controls in the record control section are:

an eject (EJE) button 32 which, when operated, causes the stylus to be lifted from the record and traversed to a "home" position associated with the size of record then selected by button 33, 34 or 35, and causes the record loading door 13 to open and either to present the record then in the record player for access for removal from the record player or to enable a record to be loaded onto the record support arms carried by the door; if stop button 29 has not previously been operated, operation of eject (EJE) button 32 also causes the record player mechanisms to carry out the operations and functions associated with depression of STOP button 29 except for shut-off of power in the record player;

record size pushbuttons 33, 34 and 35 corresponding to play of records of 7 inch, 10 inch and 12 inch diameter, respectively, the depression of any one of which causes the record support arms on door 13 to be positioned for support of a correspondingly sized record; operation of these buttons also defines the "home" position of the stylus above the run-in portion of the appropriately sized record immediately adjacent to its outer margin;

speed control pushbuttons 36 and 37 for selecting 33⅓ and 45 rpm operating rates of the turntable; the actual speed of the turntable is shown by the digital display section of the control panel (e.g., 33.33) during play of a record;

a continuous (CON) play control pushbutton 39 which instructs the player to play a record continuously, i.e., over and over, until STOP button 29 is actuated;

an elapsed time (ET) pushbutton 40 which, when operated, causes the elapsed playing time, measured from the beginning of that play sequence to be displayed on display units 25 in minutes and seconds (e.g., 3:47); and a position (POS) control pushbutton 41 which causes the position of the stylus to be displayed in display section 24 in millimeters and tenths and hundredths of a millimeter (e.g., 21.37) from a predetermined "home" position.

Fine-tuning speed control rings 42 and 43 are associated with the speed selection pushbuttons 36 and 37. These control rings are coupled to fine-tuning potentiometers 44 and 45 (see FIG. 3) to enable the user to accurately adjust the actual operating speed of the turntable.

The digital input section 22 of control panel 14 is composed of twelve pushbuttons arranged in a 3×4 matrix, including ten digital data input buttons marked with the numerals 0-9, a decimal point pushbutton 46, and a correction button 47 which enables an error to be corrected. The buttons in this section of panel 14 are not illuminated.

The computer control section 23 of the control panel is composed of nine independently illuminated pushbuttons arranged in a 3×3 matrix. The controls in this section of the control panel are:

a memory (MEM) pushbutton 48 which, when depressed, activates the write portion of the magnetic read-write head assembly for recording appropriate data onto the magnetic track carried by the label portion of a record in the record player; see the following description pertinent to FIG. 15; if the record player is a modification of the preferred record player illustrated and described herein which does not include a magnetic read-write head, operation of the MEM button 48 causes numeric data entered on the digital input section 22 to be transferred to a memory associated with this button and coupled to the microprocessor built into the record player;

a play (PLA) control pushbutton 49 which enables programming of a play memory (random access) to describe the sequence in which different passages of a record then in the player will be played on operation of PLAY button 30;

a clear (CLR) pushbutton 50, the operation of which clears the display section 24 of the control panel, and also a selected one of the two separate memories associated with the MEM and PLA buttons;

a review (REV) control pushbutton 51 which recalls from memory, either from the record itself or from within the record player, and displays in the display section 24 either a MEM recorded program or a PLA recorded program; changes in the program can be made while the review button is operated, a selection (SEL) control pushbutton 52 which enables designation of a selection of interest; the user enters the number then displayed in display section 24 by operation of the record player or called up on the display section by operation of the position (POS) pushbutton 41;

a line (LIN) control pushbutton 54 the operation of which causes a program entered into the logic of the player, either from its built-in memory or from the record itself, to be displayed line-after-line in display section 24; this control enables a user to locate a spot in a given program for rerecording or revision;

beginning (BEG) and end (END) pushbuttons 53 and 55 which correspond to the beginning and end of a selected passage; during operation of these control pushbuttons, the user enters the position of the stylus corresponding to the beginning and end of a selected passage, such entry being accomplished either manually through the digital input section of the control panel, or automatically by operation of the position (POS) button; and a repeat (RPT) control pushbutton 56 which enables the user to enter, via the digital input section, a number instructing the record player to repeat play of a selected passage a designated number of times before proceeding to the next programmed passage.

The principal structural elements of record player 10 are a bottom pan 60, preferably a casting, and a top frame 61, also preferably a casting. The top frame is supported on the bottom pan on suitable posts 62, one of which is shown in FIG. 13, to dispose the top frame generally horizontally parallel to the bottom pan, but closely adjacent to the underside of cover 11, thus providing a generally open space within the interior of the record player into which a record may be moved by operation of door 13. The cover 11 preferably is carried in a wooden frame 63 which defines the outer perimeter of the record player. The wooden frame is hinged to bottom pan 60 along the rear of the record player and is held in position on the bottom pan by suitable screws. Door 13 has a closed position in an opening 64 formed on the front face of the frame, as shown in FIG. 13.

Figure 3:
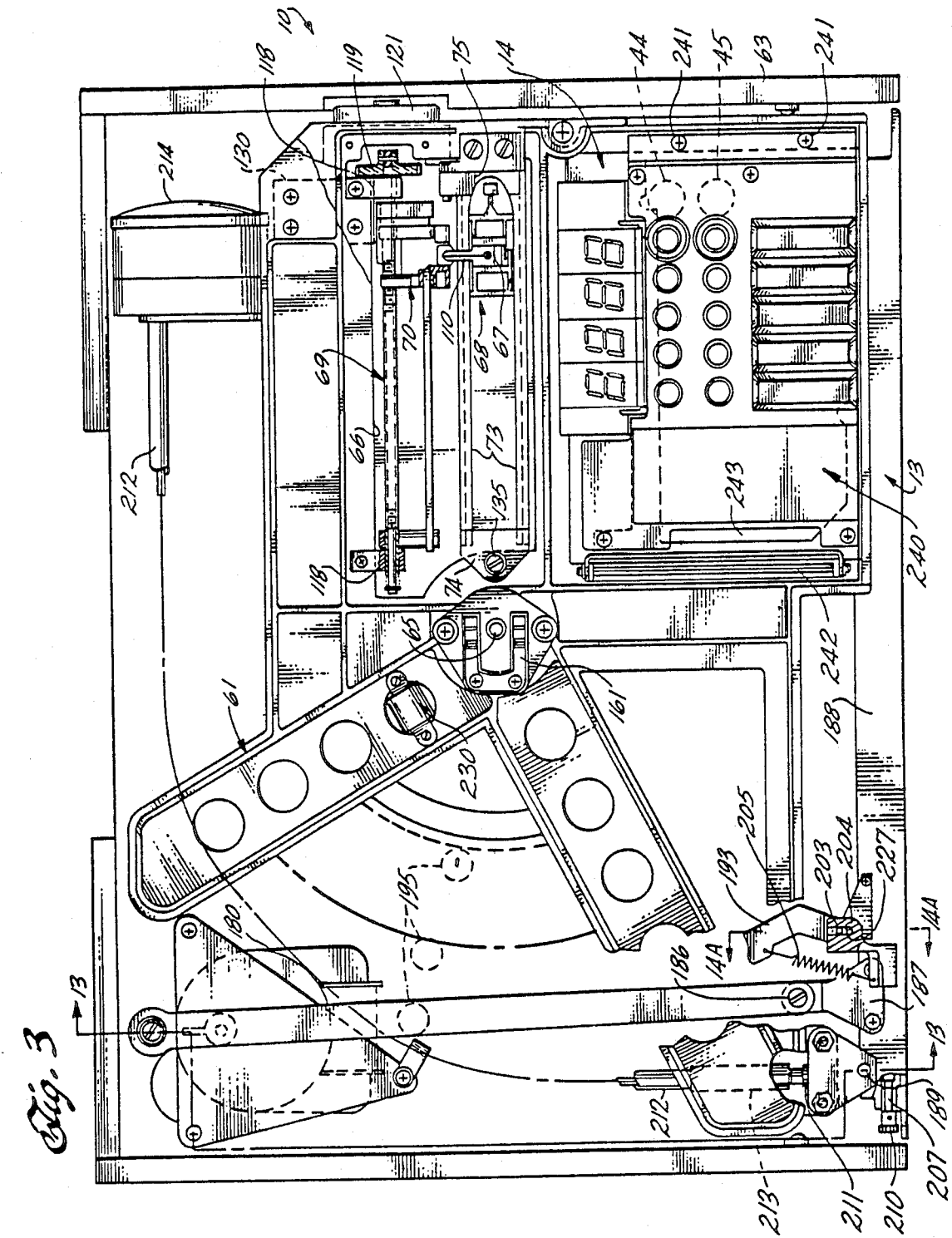
FIG. 3 is a top plan view of the record player of FIG. 1, with the cover thereof removed.

FIG. 3 is a simplified plan view, with some parts broken away and others shown in section, of the structure which is visible within the interior of record player 10 when cover 11 is opened. A major reference point of interest in the record player is the centerline, i.e., axis of rotation, 65 of a record 80 disposed in the record player. As viewed in FIG. 3, top frame 61 has an elongate opening 66 formed in it to the right of record axis 65 above control panel 14. The window 15 in cover 11 is located above this opening. The transducer cartridge and its stylus, it support suspension and carriage, the support tracks for the cartridge carriage, and the cartridge positioning and positioning sensing mechanisms are all located in top frame openings 66; see FIG. 3. The stylus transducer cartridge is indicated generally in FIG. 3 at 67, the cartridge suspension and carriage at 68, the cartridge positioning and position-sensing mechanism at 69, and the follower member of the positioning and position-sensing mechanism at 70.

The preferred transducer cartridge used in record player 10 is a Bang & Olufsen stereophonic phonograph transducer cartridge Type MMC-4000, which is modified in the manner described below. The cartridge is disposed in the record player so that the sensitive axis of its transducer mechanism is vertical, i.e., parallel to record axis 65. The Bang & Olufsen cartridge is modified in the manner in which the diamond stylus is coupled to the transducer movement. In this type of cartridge, as supplied by the manufacturer, the stylus is carried on the unsupported end of an elongate, straight, tubular cantilever beam which is connected to the moving elements of the transducer movement. The stylus is mounted on that side of the cantilever support which is disposed downwardly when the cartridge is mounted as intended by the manufacturer, i.e., in a generally horizontal manner, so that the stylus support cantilever is disposed at an angle of about 20° to the plane of rotation of the record with which the stylus is engaged; compare FIG. 10 of my prior U.S. Pat. No. 3,658,347. To adapt this cartridge, i.e., the Bang & Olufsen Type MMC-4000 cartridge, for use in record player 10, the stylus cantilever is shortened to about $\frac{1}{4}$ of its original length, and the stylus is bonded into the end of the shortened stylus support tube. When the cartridge is mounted vertically relative to the record, the stylus is disposed along the sensitive axis of the cartridge transducer movement, and the stylus support arm is loaded essentially only axially as it follows the contours of the record groove which bear the audio information recorded on the phonograph record disc. It will be understood, however, that the stylus is also continuously loaded by the outer sidewall of the spiral groove as the record is rotated past the stylus; it is this side-loading of the stylus which is relied upon to drive the cartridge radially of record axis 65.

As shown best in FIGS. 4–6C, the stylus suspension carriage 68 is disposed between and carried by a pair of support rails 73 which, in cross-section, have a configuration resembling a structural channel, each channel being disposed so that the flanges thereof extend toward the other channel. The inner and outer ends of the rails are mounted to inner and outer end plates 74 and 75 which, in turn, are connected to top frame 61. The stylus suspension carriage includes a pair of substantially identical carrier members 76, the principal portions of which are disposed on opposite sides of the cartridge 67 between rails 73. The opposing faces of the carrier members define preferably identical, parallel, convexly curved cylindrical surfaces 77 (see FIG. 6). The terms "cylinder" and "cylindrical" are used in their broad mathematical meanings to describe surfaces 77 of carrier members 76. That is, a cylinder, in the mathematical sense, is defined as the surface traced or generated by a straight line, the generatrix, moving in space at all times parallel to another straight line, the directrix. Preferably, the cylindrical surfaces 77 are circularly cylindrical. Also, in the carriage suspension shown in FIG. 6, for example, the arrangement is geometrically balanced by virtue of carrier member pivot axes 78 being spaced equidistantly from the respective cylindrical surfaces 77, with the result that surfaces 77 in the preferred arrangement have equal radii of curvature. It will be appreciated, however, that it is not necessary that the cylindrical surfaces be of circularly cylindrical configuration or that they be identical; a change in the effective length between one cylindrical surface and the associated pivot axis, relative to the corresponding length associated with the other carrier member, can be compensated, in terms of the result desired in the cartridge suspension mechanism, by an adjustment in the curvature of one cylindrical surface or the other. It is important, however, that the directrices of the two cylindrical surfaces be parallel to each other. Preferably, as in the illustrated embodiment shown in FIG. 6, the directrices of the cylindrical surface 77 coincide with pivot axes 78.

The carrier members 76 are mounted to support rails 73 for rotation of each carrier member relative to the rails about a respective one of pivot axes 78. In carriage suspension 68, this mounting is accomplished by roller wheels 79 which, as shown in FIG. 5, are engaged between the opposing surfaces of the flanges of the respective ones of rails 73. The mounting of the carrier members to the support rails is such that the pivot axes (a) are spaced from the respective cylindrical surface 77 in a direction away from the other carrier member 76, (b) are parallel to the respective cylindrical surface directrix (in the preferred embodiment the pivot axes and directrices coincide), andd (c) are parallel to the disc plane of rotation when the carrier member supports, i.e., support rails 73, are in operating position relative to a record in record player 10. Where the directrices and pivot axes of the respective carrier members do not coincide, the mounting of the carrier members to the support rails is also arranged to provide for movement of at least one of the pivot axes toward and away from the other pivot axis in a direction which is parallel to the disc plane of rotation when the carrier member support is in operating position relative to a record. It will be observed that, in suspension mechanism 68, both pivot axes 78 are movable together in a direction parallel to the plane of rotation of record 80 as shown, for example, in FIG. 5. The playing position of record 80, as shown in FIG. 5, is the upper position of the record; the lower position of the record corresponds to the position of the record on first introduction into the record player when the turntable is in its lowered position along its axis of rotation.

Figure 6B:
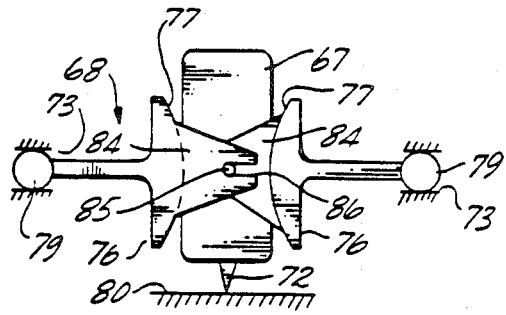
FIG. 6B is a schematic elevation view of the suspension mechanism in one state thereof.
Figure 6C:
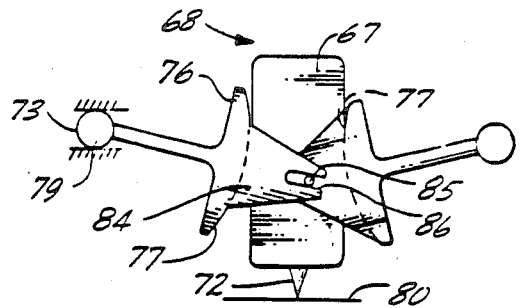
FIG. 6C is a view similar to the view of FIG. 6B showing the suspension mechanism in another state thereof.

Suspension mechanism 68 also includes a flexible strap arrangement 81 (see FIG. 6A) which is coupled between the carrier members 76 and cartridge 67 to (a) substantially encircle the cartrige when it is positioned between cylindrical surfaces 77, (b) for holding an encircled cartridge in substantially frictionless rolling contact with cylindrical surfaces 77, and (c) for constraining the encircled cartridge to move relative to the support, i.e., rails 73, in response to loads applied to the cartridge in a direction normal to the plane of rotation of record 80. Preferably, the strap arrangement 81 is fabricated of thin (0.001 inch) Mylar film and, when installed, has the configuration shown in FIG. 6A which shows the strap arrangement in its actual geometry in use. In FIG. 6, the strap arrangement 81 has been broken into two parts to better illustrate its geometry and relationship to both the cartridge and the carrier members. As seen in FIG. 6A, the strap passes twice through itself to define a figure resembling an "8" having three lobes; the two end lobes encircle the major portions of the carrier members which define surfaces 77, and the center lobe encircles the cartridge. The coupled position of the flexible strap arrangement to the carrier members is indicated in FIG. 6 by broken lines 82. A hole 83 is formed through the strap arrangement at an appropriate location in its central lobe to enable the stylus support arm to project from the cartridge per se through the strap arrangement toward record 80.

Suspension 68 also includes link means which are coupled between carrier members 76 for causing both carrier members to move in synchronism in opposite directions, i.e., one clockwise and the other counterclockwise, about their respective pivot axes 78 in response to loads applied to an encircled cartridge 70 in a direction normal to the plane of rotation of record 80. Usually such loads are applied to the cartridge by the localized contour of the record groove, but more significantly by warpage of the record. The linkage between the carrier members is defined in suspension 68 by a pair of fingers 84 which extend from opposed ends of each of cylindrical surfaces 77 toward the other carrier member, by a pin 85 which extends from one finger 84, and by a pin receiving slot 86 formed in the end of the other finger. Pin 85 is centered midway between cylindrical surfaces 77. A link arrangement, as described above and as shown in FIG. 6, may be provided at both ends of the carrier members, if desired.

A threaded shaft 87 extends from one of carrier members 76, at a location between that carrier member's roller wheels 79, in a direction which preferably causes the axis of shaft 87 to pass through the center of cylindrical surface 77 of that carrier member. A counterbalance mass 88 is threadably engaged on shaft 87. The position of counterbalance mass 88 on shaft 87 is adjustable to define the tracking force which is produced between the stylus 72 carried by cartridge 67 and record 80 during play of the record in record player 10. This tracking force can be adjusted to be essentially zero. That is, the position of mass 88 on shaft 87 is adjusted to compensate for the tendency of the carrier members, and the cartridge engaged between them, to rotate in a direction causing the cartrige to move toward the playing position of record 80.

From the foregoing description of cartridge suspension mechanism 68, it will be apparent that the coupling of the cartridge to carrier member 76 by flexible strap arrangement 81 provides an essentially frictionless and free floating suspension of cartridge 67 between support rails 73. Accordingly, the cartridge suspension has very high compliance to loads imposed on the cartridge along the line of the stylus support member 71. This means that the cartridge is virtually insensitive to loads imposed upon it by warpage in a record 80, and that the transducer movement of cartridge 67 produces electrical output signal which are accurately indicative, to an extent which has heretofore been impossible to achieve as a practical matter, of the audio information recorded in the groove of record 80. Because the carriage suspension is itself supported beween rails 73 on roller wheels 79, the entire cartridge suspension is movable along a path radially of record 80; rails 73 are disposed parallel to and on opposite sides of a line radially of turntable axis 65. It is therefore apparent that cartridge 67, and stylus 72 carried thereby, are mounted in record player 10 to be sensitive to only those motions which are experienced by the cutting tool of the lathe used to cut the master disc from which record 80 is replicated. This suspension is of very high compliance in view of the low mass of the moving parts of the suspension, and in view of the friction-free or very low friction connections within the suspension itself and of the suspension to support rails 73.

It will be appreciated that cartridge suspension 68 has utility in record players other than record player 10. Thus, FIG. 9 shows the use of suspension 68 in the unsupported end 89 of a tone arm 90 of substantially conventional configuration. The tone arm is pivoted, both vertically and horizontally, at its opposite end 91 to the mounting board 92 of a record player 93 which, in common terminology, is referred to simply as a "turntable". Rotatably driven record support table 94 is also mounted to the mounting board so that, when the tone arm is moved about its vertical pivot axis, the position of the stylus at the opposite end of the tone arm traverses the circular arc 95 which approximates a radius 96 from the table axis of rotation 97. Preferably tone arm 90 is counterbalanced, as by counterblance mass 98, so that it is essentially statically balanced and the desired tracking force is defined between the stylus and a record supported on table 94 by adjustment of mass 98. Tone arm 90 is freely movable about its vertical pivot axis, but is highly damped against motion about its horizontal pivot axis to render the unsupported end of the tone arm substantially resistant to movement in response to transient loads applied vertically to it.

FIG. 9 shows that one of the pivot axes associated with the carrier members of suspension 68 may be fixed relative to the suspension support which, in this case, is defined by the tone arm structure itself. The other pivot axis of the suspension preferably is movable relative to the support, as by the inclusion of short rails 99 in the structure of the tone arm.

Figure 10:
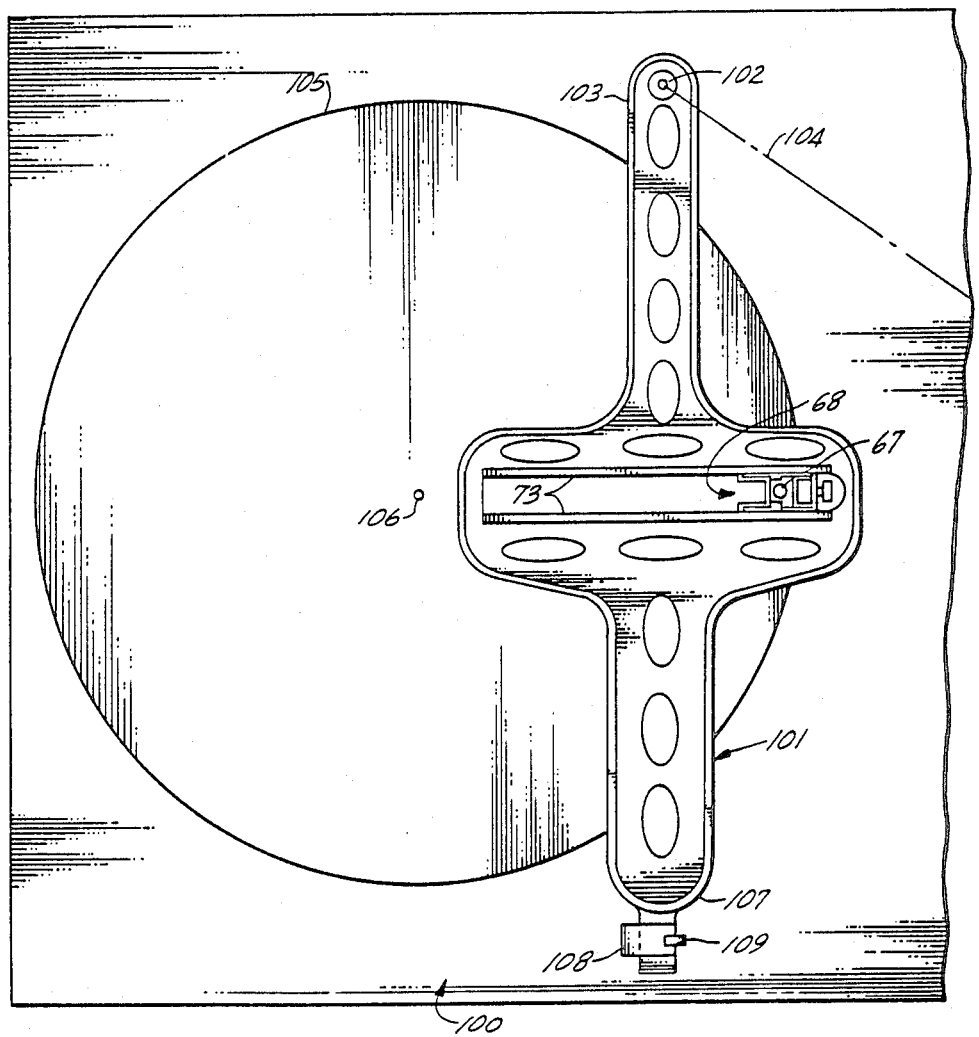
FIG. 10 is a plan view of another record player incorporating the suspension mechanism and radial-tracking aspects of the record player shown in FIG. 1.

FIG. 10 illustrates that the improved cartridge suspension described above may be incorporated in a turntable 100 in combination with a radial-tracking arrangement, as shown in FIG. 3, for example. In this instance, cartridge suspension 68, substantially as described above with respect to FIG. 3, for example, is disposed between a pair of parallel support rails 73 which are in turn carried by a rigid frame 101 which is pivotally mounted, as at 102, at one end 103 of the frame to the basic structure of turntable 100. Frame 101 has a playing position which is shown in solid lines in FIG. 10, and also a retracted position indicated by broken line 104 in FIG. 10. In its retracted position, the frame is moved out of a location above the record support table 105 so that a record can be placed on and removed from the table. Rails 73 are so disposed in frame 101 that, when the frame is in its operating position as shown, the rails are spaced parallel to and on opposite sides of a line radially from the axis of rotation 106 of table 105. Frame 101 may be a rigid casting, for example, of sufficient length to span the rotary table 105 when the frame is in its operating position. It is supported at its end 107, opposite from pivot 102, in its operating position by a support 108 in which the frame may be locked, as by a latch mechanism 109, to fix the operating position of frame 101. Turntable 100, as shown in FIG. 10, is a manually operable radial-tracking record player incorporating the highly compliant, low tracking force cartridge suspension mechanism described above.

Referring to FIGS. 3, 4, 5, 7 and 8, it was noted above that cartridge positioning and position sensing mechanism 69 includes a cartridge follower member 70. From the following description, it will be appreciated that this mechanism may be used in association with a cartridge suspension mechanism different from cartridge suspension mechanism 68 described above with reference to FIGS. 3–6C, 9 and 10. In record player 10, the stylus follower member 70 cooperates with an arm 110 which is secured to the top of cartridge 67, and which extends across the top of that one of rails 73 which lies to the rear of record player 10. The arm extends along a line perpendicular to the path of movement of the cartridge radially of turntable axis 65. The upper surface of arm 110 carries a reference mark 111 (see FIG. 7) which is observable by a user through window 15, and which, in cooperation with an appropriate one of scales 16, 17 and 18, visually indicates the position of the stylus at any point during the course of playing a record. Reference mark 111 is vertically aligned with the position of stylus 72 in cartridge 67. The end of the arm 110 which lies remote from the cartridge defines a downwardly extending finger 112 which cooperates in a recess 113 formed in the forward extent of follower member 70.

The follower member is disposed adjacent to the cartridge, as shown in FIGS. 3 and 4, for movement along a path which is parallel to the line of movement of cartridge 67 radially of turntable axis 65. The follower member is normally out of physical contact with the cartridge, but follows movement of the cartridge in the manner described below during playing engagement of stylus 72 with record 80. Sensing means are carried by the follower member for cooperation with arm 110 for sensing the position of the cartridge along its line of movement, and for generating a signal which is indicative of the relative positions between the cartridge and the follower member as the cartridge and the follower member move along their parallel paths. Further, drive means are coupled to the sensing means to be responsive to the signal generated by the sensing means. These drive means are also coupled to the follower member for driving the following member to cause the signal to tend toward zero. Thus, the relative position between the cartridge and the follower member is continually monitored, a signal is generated indicative of the relative positions between these elements, and that signal is relied upon to cause the follower member to be driven parallel to the radial line of movement of the cartridge to cause the follower member to stay very closely in a predetermined alignment with the cartridge.

More specifically, a finely threaded leadscrew 114 is supported adjacent the rear edge of top frame opening 66 parallel to rails 73. The rear extent of follower member 70 is engaged with the leadscrew so that the follower member is driven in one direction or the other, dependent upon the direction of rotation of the leadscrew, along a path parallel to rails 73. The follower member is also supported forward of the leadscrew on a rod 115 which is parallel to the leadscrew and which is supported at its opposite ends in forwardly extending lugs 116 of bracket 117. The bracket is rotatably journalled about the leadscrew adjacent the opposite ends of the leadscrew. Rod 115 passes through the follower member to the rear of recess 113. The normal position of bracket 117 places leadscrew 115 and rod 115 substantially in a common plane parallel to the plane of rotation of record 80. At its extreme right end, as viewed in FIGS. 4 and 5, a gear 119 is secured to the leadscrew shaft to the right of a support arm 118 in which the leadscrew is rotatably journalled. Gear 119 cooperates with a gear 120 which is fixed to the output shaft of a stepping motor 121 which is mounted to top frame 61 below gear 119. The stepping motor is a reversible mechanism. It is apparent, thus, that the follower member 70 is driven in one direction or the other parallel to rails 73 dependent upon the direction of rotation of the stepping motor. The output signal derived from the sensing means in the follower member is used to control the amount and direction of operation of the stepping motor, thereby to cause the follower member to be driven to closely follow the motion of the cartridge within predetermined limits.

It is desirable that the cartridge be able to move radially of the record solely in response to the "feed" of the spiral groove of the record 80 past stylus 72 without constraint in any respect (save for the small amount of friction associated with rollers 79) during play of record 80. Accordingly, the cooperation of the sensing means within the follower member with the cartridge is a cooperation which is not dependent upon physical contact between the cartridge and the follower member.

In record player 10, the sensing means within the follower member is an optical sensor which includes a collimated light source 122 mounted in the rear face of recess 113 to direct a beam of collimated light perpendicular to the path of movement of the follower member. The optical sensing means also includes a beam splitter which is defined by a pair of mirrored surfaces 123 defined by the rearmost extent of finger 112. Mirrored surfaces 123 are disposed at right angles to each other, and a bisecter of the included angle between these surfaces is perpendicular to the path of movement of the cartridge along rails 73 and passes through the axis of the stylus support 71. The sensing means further includes a pair of photocells 124 which communicate to recess 113 through the sidewalls thereof. The photocells are coaxially aligned along a line, which passes through finger 110 at a point slightly toward the cartridge from the point of intersection of mirrored surface 123; see FIG. 7.

Figure 7:
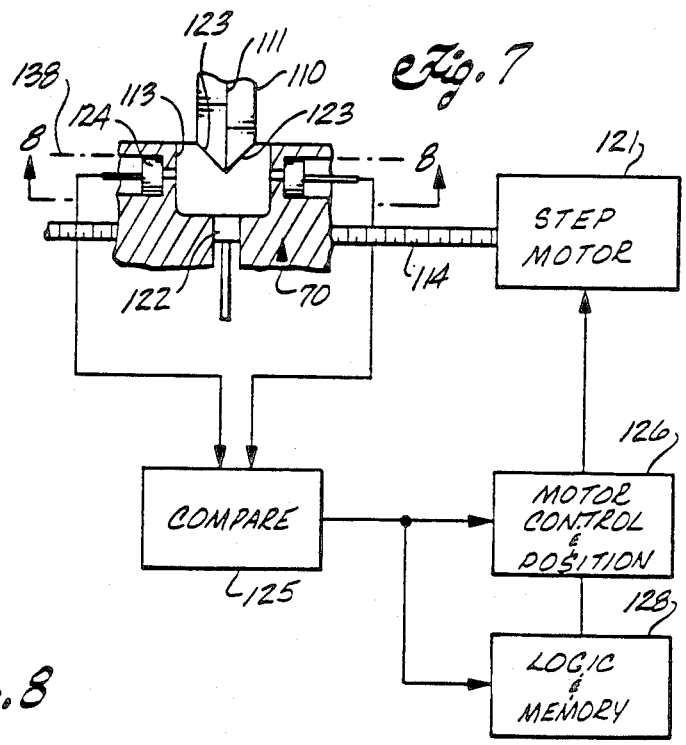
FIG. 7 is a simplified fragmentary cross-sectional elevation view and block diagram illustrating the cooperation between the cartridge and the follower member of the cartridge position sensing mechanism.

The predetermined positional relationship between the cartridge and the follower member, which is sought to be maintained by operation of stepping motor 121, is a relationship in which the line of intersection between mirrored surfaces 123 of the beam splitter is directly aligned with collimated light source 122. In this situation, photocells 124 receive equal amounts of light, and the difference between the outputs of the photocells, as determined by a comparison circuit 125, is a control signal having zero value. It will be appreciated that, as record 80 is played, the cartridge is advanced along its line of movement in response to the feed of the record spiral groove past the stylus, and that the cartridge will tend to lead the position of the follower member from time-to-time in a direction toward turntable axis 65. At this occurs, the mirrored surface 123 closest to turntable axis 65 will receive less light from the light source than the other mirrored surface, thereby producing a difference between the outputs of the photocells and producing a signal from comparison circuit 125, which has a positive or "forward" command meaning. This signal is intepreted by a motor control and positioning circuit 126 coupled between the stepping motor and the comparison circuit, as indicated in FIG. 7. The stepping motor is therefore instructed, by the motor control and position circuit itself, or via the logic and memory portions 128 of the computerized control system shown in FIG. 16, to operate the stepping motor sufficiently to advance the follower member to restore the predetermined positional relationship between the follower member and the cartridge.

The width of recess 113, in a direction parallel to the path of movement of the follower member, is sufficiently greater than the width of cartridge finger 112 to provide a clearance between the opposite sides of the finger and the sidewalls of the recess when the desired positional relationship between the cartridge and the follower member exists. This clearance corresponds to plural steps of stepping motor 121. In record player 10, the pitch of the leadscrew 114, the gear ratio defined by the gears 119 and 120, and the rotation of gear 120 for each step of motor 121 all cause the follower member to be moved approximately 0.02 millimeter for each step of the stepping motor.

The logic and memory aspects of the control system for record player 10 are represented generally in FIG. 7 at 128. This aspect of the control system includes a counter in which is accumulated a count of the pulses required to operate the stepping motor sufficiently to drive the follower member from any given position along its path of movement back to a "base" position thereof which is defined at the limit of its travel along rod 115 adjacent to turntable axis 65. On operation of the position (POS) control button 41 on control panel 14, the number accumulated in this counter, translated into millimeters from the "home" position of the follower member, is displayed in the visual display section 24 of control panel 14. The width of the audio information-carrying band on a 12 inch record is 96 mm. The counter associated with the "base" position of the stylus has a capacity sufficient to accumulate a count equal to the member of pulses necessary to operate motor 121 to drive the follower member 70 a distance of 96 mm. It is this count which is actually assigned to memory when the computer in the record player is programmed to determine the manner in which a given record is to be played. The complement of this count is displayed, assuming a 12 inch record has been selected by operation of button 35, when POS button 41 is depressed. The number displayed in display section 24 of control panel 14 on operation of the POS button is the distance in millimeters of the stylus from its "home" position. The "home" position is defined at the run-in portion of a record of interest, i.e., at the outer margin of a record. The width of the information band of a 10 inch record is 70 mm, and is 30 mm for a 7 inch record. Thus, when buttons 33 or 34 are operated to select a 7 inch or a 10 inch record respectively, counts corresponding to the figures "66.00" and "26.00" are automatically subtracted from the count in the counter which cumulates the count complementary to the count in the counter associated with the "base" position of the stylus; this adjusted count is displayed in display section 24 on operation of POS button 41 when a 7 inch or 10 inch record has been selected. Thus, the record player operates internally in terms of the "base" position of stylus 72 close to axis 65 (which position is common to all sizes of records), but communicates via display section 24 to a user of the record player in terms of the outer edge of whatever record is of interest to the user because people usually think in terms of the beginning of a record.

Mechanism 69 is also arranged for positioning cartridge 67 in any desired position along its path of movement radially of turntable 65, either preparatory to the playing of a record in the conventional manner, preparatory to playing of a selected passage of the record lying at some selected point between the run-in and run-out portions of the record groove, or for causing a selected portion within a record to be repeated one or more times. Accordingly, the cartridge positioning and position sensing mechanism 69 is arranged to lift the cartridge in its suspension to cause stylus 72 to be moved out of contact with record 80, and then to move the cartridge in either direction along its path of movement relative to the record.

The cartridge lift mechanism includes a solenoid 130 having a reciprocable armature 131 which is connected to a depending lug 132 of bracket 117, which in turn supports rod 115 along which follower member 70 is movable in response to rotation of leadscrew 114 (see FIGS. 4 and 5). When the solenoid is operated, its armature 131 is extended to cause bracket 117 to be rotated about the leadscrew in a direction which causes shaft 115 to revolve upwardly out of its normal position. Such movement of the rod moves the follower member 70 so that the bottom of recess 113 engages the lower end of cartridge arm finger 112, and lifts the cartridge in its suspension 68. In this manner, the stylus 72 is lifted out of contact with record 80 while the record is in its playing position within the record player.

Figure 8:
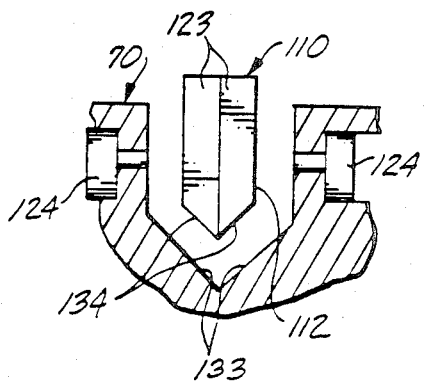
FIG. 8 is a view taken along line 8—8 in FIG. 7.

As shown best in FIG. 8, the bottom of follower member recess 113 is defined by two sloping surfaces 133 which intersect along a line equidistantly between the sidewalls of the recess and perpendicular to the follower member path of movement. The lower end of finger 112 defines a pair of sloping surfaces 134, the line of intersection between these surfaces being parallel to the line of intersection of surfaces 133 and intersecting the line of intersection of beam splitter mirrored surfaces 123. Each of surfaces 134 is parallel to a respective one of recess bottom surfaces 133. Therefore, as the forward portion of follower member 70 is raised in response to operation of solenoid 130, surfaces 133 and 134 engage each other and cause the cartridge to assume its desired predetermined positional relationship relative to the follower member. In this situation, the position of the follower member along its path of movement, as determined by the count of the number of stepper motor pulses relative to the "base" position of the follower at that instant, corresponds precisely to the position of the cartridge.

Stepping motor 121 has two operating modes. In one operating mode, it is operated by discrete pulses which are supplied to it in response to the difference signal produced by comparison circuit 125 during play of a record to cause the follower member 70 to tend to maintain its predetermined positional relationship relative to the cartridge as the cartridge moves in response to engagement of stylus 72 with the record groove. The second operational mode of the stepping motor is a slew mode in which the motor is operated rapidly to drive the follower member for the purpose of disposing the cartridge in a predetermined position, as described above. Operation of the stepping motor in its slew mode corresponds to the high speed traversing movement of the cartridge. Solenoid 130 is functionally interlocked with the stepping motor so that the stepping motor cannot be operated in its slew mode unless and until the solenoid is operated to raise stylus 72 out of engagement with record 80. This interlock function is performed by a read-only memory which is a component of the overall record player control system illustrated in the block diagram of FIG. 16. Traversing of the cartridge to a predetermined position is accomplished by inserting into an appropriate "desired position" counter a number corresponding to the desired position of the cartridge, and then operating the stepping motor in its slew mode until the number in the complementary counter mention above equals the number in the "desired position" counter. When the stylus has been moved by operation of the stepping motor in its slew mode to the desired position, energization of solenoid 130 is discontinued to lower the stylus into contact with the record.

It will be apparent from the foregoing description that the stylus can be prepositioned along its path of movement radially of the turntable axis to within 0.02 millimeter accuracy. The width of the spiral groove in record 80 is greater than 0.02 millimeter. Thus, the stylus can be prepositioned at any desired location relative to the record groove subject only to the ambiguity associated with the angular position of the record relative to the stylus.

The presently preferred stepping motor 121 is a Type SM40-3602 stepping motor manufactured by Fuji Electrochemical Co., Ltd., Tokyo, Japan. It is preferred that the motor control and position circuit 126 (see FIG. 7) be defined by a Fuji Electrochemical driver module, Type SD-01. A Fuji Electrochemical Type SM40-3602 stepper motor has a single step angle of 10°, and has maximum pull-in and pull-out pulse rates of 340 and 510 pulses per second, respectively.

Cartridge 67 is made accessible within record player 10 for various purposes, including changing stylus 72 as it becomes worn. To provide such access to the cartridge and the stylus, the cartridge support rail assembly is mounted to be rotated to provide access to the stylus, for example, but in such a manner as not to interfere with the cooperation between the cartridge and the cartridge positioning and position sensing mechanism. Accordingly, rail inner end plate 73 is connected to the top frame 61 of the record player by a screw 135 (see FIG. 3) and the outer end plate 75 is connected to the frame by a screw 136 (see FIG. 4) and by a hinge pin 137. Hinge pin 137 is aligned parallel to rails 73 between the rails and follower member support rod 15. When screws 135 and 136 are removed, the entire support structure for the cartridge suspension, i.e., the rails 73 and their connecting end plates, with the cartridge and its suspension, may be moved into a more accessible position by rotation of outer end plate 75 about hinge pin 137 has an axis 138 which, as shown in FIG. 7, passes through the center of beam splitter mirrored surfaces 123 slightly forwardly of the axis along which photoceslls 124 are aligned. Thus, the cartridge can be moved for service or access out of its normal operating position in the record player without damaging the signal generating mechanism associated with the follower member 70.

As noted above, my prior U.S. Pat. No. 3,658,347 describes a radial-tracking record player in which the record, during play, is held clamped between a rotatable turntable, located below the record, and a rotatable clamp disc mounted coaxially of the turntable above the record. The turntable is movable axially along its axis of rotation to provide a space between the turntable and the clamp disc into which the record may be inserted to thereeafter be gripped between the turntable and the clamp disc. My prior patent describes a screw mechanism, coupled between the turntable and the turntable drive motor, for causing the turntable both to be driven along its axis toward and away from the clamp disc and, when disposed in its playing position, to be rotated at a desired speed as determined by the operational rate of the turntable drive motor as coupled to the turntable. In the prior patent, the turntable drive mechanism includes a printed circuit motor which has its axis displaced from that of the turntable and coupled via a capstan to an idler having its axis of rotation coincident with that of the turntable. The screw mechanism is coupled between the idler hub and the turntable. Reference is made to the detailed descriptions and illustrations in my prior patent 3,658,347 for an enhanced understanding of the content of FIGS. 11 and 11A hereof, which drawings illustrate a clamp disc 159, a turntable 148 and a coaxially aligned printed circuit motor 141 with a screw mechanism 146, similar to that shown in my prior patent, coupled between the motor and the turntable. The details of the coupling between the turntable and the motor are shown in FIG. 11A.

An enclosing pan 140 of a Yaskawa printed circuit motor 141 is mounted to record player bottom pan 60 coaxially of turntable axis 65; see FIG. 11. The motor has a rotor 142 which cooperates with magnets 143 in the motor. The rotor is annular and carries at its inner rim an axially bored hub member 144, the bore of which is threaded to cooperate with mating threads 145 (see FIG. 11) formed on the exterior of a cylindrical coupling member which is in turn axially bored to receive a shaft 147. Rotor hub 144, coupling member 146, shift 147 and turntable 148 preferably are made of aluminum so as not to interfere with the magnetic circuitry of printed circuit motor 141. Rotor hub 144 is rotatably mounted to motor pan 140 by bearing 149 so that it is only rotatable about axis 65. The turntable has a relatively small diameter, axially bored depending hub 150 (see FIG. 11A) in which shaft 147 is received below an enlarged head 151 of the shaft. Shaft head 151 defines a centering spindle for the small diameter center holes of 7 inch, 10 inch and 12 inch phonograph records.

As shown in FIG. 11A, the upper end of coupling member 146 defines an upwardly-open annular recess 152 intermediate its inner and outer walls for receiving the lower end of a bias spring 153. Spring 153 cooperates with the lower end of an annular hub of an annular secondary spindle member 154 which is sized to mate within a large diameter center hole of a 7 inch record. The secondary spindle hub mates with the outer diameter of the turntable hub and is urged upwardly along the turntable hub by bias spring 153 toward engagement with the underside of turntable 148 outwardly of the turntable hub. The secondary spindle projects through the turntable at three places; it is rotatable at all times with the turntable and is movable axially relative to the turntable. The inner diameter of bias spring recess 152 in coupling member 146 corresponds to the outer diameter of turntable hub 150. As shown in FIG. 11A, shaft 147 is keyed to the turntable hub by a key 155 and is keyed to coupling member 146 by a key 156. Accordingly, coupling member 146, shaft 147, turntable 148 and secondary spindle 154 all rotate as a unit, which unit is rotatable relative to motor rotor hub 144 by virtue of the threaded coupling between the rotor hub and coupling member 146.

As shown in FIG. 11A, a finger 157 extends radially beyond the outer diameter of the coupling member at its lower end. This finger is engageable with the lower end of motor rotor hub 144 to define the upper limit of travel of the turntable along its axis 65 relative to the motor rotor hub.

Also as shown in FIG. 11, a clamp disc 159 is rotatably mounted to a record player top frame 61 for totation about axis 65 on a vertically disposed axle 160. The clamp disc has limited movement axially along axle 160 and is biased downwardly along the axis by a spring 161; see also FIG. 3. The lower end of axle 160 is recessed, as at 162, so as not to interfere with spindle 151 when the turntable is in its raised position. The clamp disc also has a downwardly facing annular recess 163 concentric to axis 65 so as not to interfere with secondary spindle 154 when a 7 inch record having a large diameter center hole is disposed in the record player. If a 7 inch record having a small diameter center hole (sized to mate with spindle 151) is used in the record player, secondary spindle 154 is forced downwardly relative to the turntable by engagement with the record as the turntable is raised along its axis; in this respect, see the descriptions in my prior U.S. Pat. No. 3,658,347.

A pair of turntable drag elements 165 are secured to the upper ends of vertically disposed pins 166 which are journalled in the record player bottom pan at diametrically opposed locations about axis 65 within the diameter of turntable 148. The pins are biased upwardly relative to the record player bottom pan by springs 167. The upward limit of travel of the drag elements relative to the record player bottom pan is determined by enlarged heads carried by the lower ends of the pins. The upper limit of travel of pins 166 is defined at a position determined so that, when the turntable is at its uppermost limit of travel along axis 65 (corresponding to the PLAY position of a record supported on the turntable), the drag elements 165 are disengaged from the underside of turntable 148. However, the drag elements contact the underside of the turntable during the major portion of the travel of the turntable away from and back toward its lowermost position which is shown in FIG. 11.

The operational speed of motor 141 is selected by operation of either of speed control buttons 36 or 37 on control panel 14, and is adjustable by use of fine turning rings 42 or 43, as described above. Assume that the turntable is in its lowermost position as shown in FIG. 11 and a record has been inserted into the record player in the manner to be described below. At the appropriate interval in the cycle of operation of the record player, motor 141 is commanded to drive at the appropriate speed in a forward direction. At this time, drag elements 165 engage the underside of turntable 148 and tend to hold the turntable from rotation about axis 65. Motor rotor 142, however, is driven in a forward direction, thereby producing relative rotation between the rotor hub and coupling member 146. Since the connection between the rotor hub and the coupling member is a threaded connection, this relative rotation cuases the coupling member, and the unit of which it is a component, to be moved along axis 65 toward clamp disc 159. As the turntable is raised, the drag elements follow and continue to hold the turntable from rotation about axis 65; this condition continues until the drag elements reach their upper limits of travel. Shortly after the turntable moves above the uppermost position of drag elements 165, finger 157 (see FIG. 11A) engages the lower end of the motor rotor hub to prevent any further axial motion of the turntable relative to the motor rotor. At this point, the turntable will have lifted from record support arms 190 a record supported by the arms and will have moved the record into contact with the clamp disc and have moved the clamp disc somewhat upwardly against the bias of its bias spring 161. Since the turntable can no longer move axially, it must respond to continued rotation of motor rotor 142 by moving with the rotor about axis 65.

In view of the foregoing description, it will be understood that, as the turntable lifts a record from the support arms and moves it into its playing position (shown in solid lines in FIG. 11 with respect to a 7 inch record), stylus 72 will have been prepositioned at the desired point in its travel radially of axis 65. Thus, play of the record commences immediately upon engagement of the upper surface of the record with the stylus.

The turntable remains at its PLAY position until either an EJECT or STOP command is given to the record player. In response to either of these commands, the operation of turntable drive motor 141 is reversed.

As described in my prior patent, the connection of clamp disc 159 to axle 160 includes an overrunning clutch which permits the clamp disc to rotate about axle 160 only in a direction corresponding to PLAY of the record. Since the clamp disc and the turntable are engaged with record 80 via resilient cushions 168 and 169, respectively, carried by their peripheries, and these cushions have high coefficients of friction relative to the record, the clamp disc cannot respond to reverse rotation of the record. Therefore, through the agency of cushions 168 and 169, the turntable is held sufficiently against rotation in a reverse direction to produce relative rotation betwen coupling member 146 and motor rotor hub 144. This relative rotation produces downward motion of the turntable along its axis. The initial increment of downward motion of the turntable from its PLAY position is followed by the clamp disc in response to the bias of spring 161 until the underside of the turntable engages the upper surfaces of drag elements 165. Thereafter, the cooperation between the drag elements and the underside of the turntable holds the turntable from reverse rotation while the motor operates in reverse, thereby causing the turntable to be further lowered along its axis back to its lowered position shown in FIG. 11. A suitable limit switch (not shown) senses the turntable in its lowermost position and interrupts the operation of the drive motor at this time. In the course of returning to its lowermost position, the turntable carries record 80 with it and, in the process, replaces the record on support arms 190 which are carried by door 13.

Figure 12:
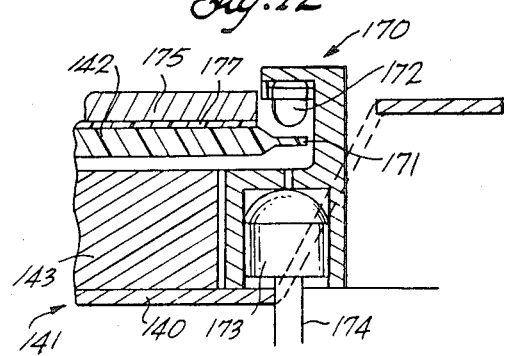
FIG. 12 is a fragmentary cross-sectional elevational view of the turntable speed control in the presently preferred record player.

FIG. 12 is an enlarged cross-sectional elevation view through turntable drive motor 141 at the periphery of rotor 142 at the location of a photo-tachometer 170 in the motor. As will be understood by those familiar with printed circuit motors, the conductors disposed on opposite faces of the rotor terminates in spikes 171 at the extreme outer margin of the rotor. These spikes are spaced uniformly about the periphery of the rotor and serve as choppers of a light beam directed by a light source 172 to a photocell 173. The output of the photocell therefore varies during variation of rotor 142 at a frequency which is directly related to the speed of rotation of the rotor. The output of photocell 173 is applied via suitable leads 174 to appropriate portions of the logic of the overall control system 250, shown in FIG. 16, where they are suitably processed to enable digital display section 24 in control panel 14 to display accurately the instantaneous speed of the turntable during play of a record. As noted above, during play of a record the display elements of display section 24 are coupled, via the logic of the control system to photo-tachometer 170, to display the actual turntable speed. The signals derived from photo-tachometer 170 are also used for phase-lock control over the speed of turntable drive motor 141.

Those familiar with printed circuit motors will recognize, upon an inspection of FIG. 11, that the printed circuit turntable drive motor 141 shown in FIG. 11 is a modification of a conventional printed circuit motor; a top pan which normally forms a part of the magnetic return path associated with magnets 143 is not present. In view of this modification, the turntable drive motor includes an annular ferromagnetic plate 175 which has a radius extending from the outer diameter of the aluminum motor rotor hub 144 to just inwardly from conductor spikes 171. Plate 175 is carried directly by motor rotor 142 and is mounted to the rotor via a layer of insulation 177. Plate 175 cooperates with magnets 143 in the manner of the top pan which has been removed to adapt the motor for use in record player 10.

It was noted briefly above that the user of record player 10 normally does not have access to the interior of the record player, and that both insertion of a record into and removal of a record from the record player are accomplished via door 13 at the front of the record player. Door 13 is not manually openable. Instead, it is openable only in response to specific commands given to the record player via control panel 14, i.e., by operation of EJECT button 32. Operation of EJECT button 32, via control system 250 shown in FIG. 16, brings into operation a door drive motor 180 located in the left rear interior corner of the record player, as shown in FIG. 3; see also FIG. 13. As shown best in FIG. 13, motor 180 is coupled to a gear box 181 having an output shaft 182. A crank 183 is connected to the gear box output shaft at one end and is pivotally connected as at 184, at its opposite end to a door drive link 185. Link 185 extends from the vicinity of the left rear corner of the record player to a pivotal connection 186 at its forward end to a bracket 18 which is connected to the frame 188 of door 13. Bracket 187 is connected to the door frame at its left end just to the right of the hinge axis 189 by which the door is mounted to the record player bottom pan 60 and top frame 61, as shown in FIG. 13. Upon the generation of a command to open door 13, door drive motor 180 is operated sufficiently to cause crank 183 to be operated through an arc 180° from the position shown in FIGS. 3 and 13, thereby to drive the door about hinge axis 189 into its fully open position, as shown in FIG. 14. Upon the generation of a further command to close the door, the drive motor 180 is operated to return the door drive mechanism to the condition shown in FIGS. 3 and 13, thereby to close the door. Suitable limit switches (see switches 178 and 179 in FIG. 21) are located within the record player to sense the position of the door drive mechanism in the door-open and door-closed states of this mechanism.

As shown in FIG. 14, a pair of record support arm assemblies 190 are mounted to door 13 and extend from the rear of the door frame 188. When the door is in its closed position, the support arm assemblies are disposed within the record player on either side of turntable axis 65. The support arm assemblies are adjustable for receiving and supporting records of either 7 inch, 10 inch or 12 inch diameter, depending upon which of record size selection controls 33, 34 or 35 has been operated. The details of the record support arm assemblies and their drive mechanism are shown in FIGS. 3, 13, 14 and 14A. Each record support arm assembly 190 includes a main arm 191 which has a fixed pivot 192 at its forward end. Pivot connections 192 are defined in the door frame 188 at its left and right ends. The pivot connection associated with the left end of the door is not visible in the plan view of FIG. 14 which shows the door 13 in its fully opened position. Main arms 191 are arranged to carry the principal portion of the weight of a record supported by them; these arms increase in depth proceeding from their unsupported ends toward their pivot connections 192 to door frame 188.

Each record support arm assembly also includes a secondary arm 193 which has a pivotal connection at 194 to the unsupported end of a respective main arm 191, which pivot connections also define a record support point 195. Secondary arms 193 are essentially flat and are arcuately curved to clear turntable 148 when the record support arm assemblies are positioned for support of a 7 inch record. A 7 inch record is represented in FIGS. 3 and 14 by broken line 196, and broken lines 197 and 198 represent 10 inch and 12 inch diameter records, respectively. (In FIG. 14, broken line 199 represents the run-out of a 7, 10 or 12 inch record, broken line 200 represents the label area of all records, broken line 201 represents the large diameter center hole for a 7 inch record, and broken line 202 represents a small diameter center hole for either a 7 inch, 10 inch or 12 inch record.) Record support secondary arms 193 have a floating pivotal connection 203 at their forward ends to respective ones of adjustably positionable support members 204 (see FIGS. 3, 14 and 14A). Secondary arms 193 are each biased into engagement with the respective support members 204 by tension springs 205 which are coupled between the support members and the secondary arms. Slightly forwardly of the mid-length of each secondary arm, it carries an assembly which defines a second record support point 206. Thus, each record support arm assembly 190 defines two record support points, 195 and 206. The several record support points cooperating to define a stable mechanism for support of a record of selected size in the record player. It will be observed that record support points 195 and 206, respectively, are disposed to the rear of and forwardly of a line through axis 65 parallel to door frame 188 when the door is closed.

A pair of identically threaded screw shafts 207 and 208 are rotatably carried by the door frame 188 and are associated with the left half and right half of the door, respectively, as shown in FIG. 14. The screw shafts are parallel to each other. Screw shaft 207 is disposed adjacent to the upper edge of the door frame as shown in FIG. 14A, whereas screw shaft 208 is disposed at a lower elevation on the door frame. The screw shafts are rotatably supported at their opposite ends. At the adjacent ends of the shafts at the center of the door, each of the shafts carries a gear 209. Gears 209 are meshed with each other and are identical. Upon rotation of screw shaft 207, which is driven in the manner described below, shaft 208 is caused to rotate at the same rate but in the opposite direction. Support members 204 for the secondary record support arms 193 are threadably engaged with and supported on respective ones of screw shafts 207 and 208. When the screw shafts are rotated, the support members 204 are driven toward and away from each other in synchronism symmetrically with respect to the center of door 13. In this manner the relative positions of the left and right record support points are adjusted.

Screw shafts 207 and 208 are rotated to adjust the position of record support arm assemblies 190 only when door 13 is in its open position. Accordingly, it is not necessary that the coupling of the record size drive mechanism, of which screw shafts 207 and 208 are a part, be operable when the door is in any position other than its fully open position. Therefore, a gear 210 is affixed to the extreme left end of screw shaft 207, as shown in FIG. 3 in association with the left front corner of record player 10. FIG. 3 shows the door in its fully closed position. When the door is moved to its fully opened position by operation of door drive motor 180 in the manner described above, gear 210 is moved into mesh with a second gear 211 which is disposed to the rear door pivot 189 and which rotates about a fixed axis perpendicular to the closed position of the door. Gear 211 is mounted on the end of a flexible drive shaft 212. The end of the flexible drive shaft adjacent gear 211 is held in fixed relation to record player top frame 61 by a suitable mount 213 which is secured to the underside of top frame 61 in the vicinity of the structure which defines door pivot 189. The other end of flexible shaft 212 is connected to a door drive motor 214 which is disposed in the right rear interior corner of the record player, as shown in FIG. 3. Gears 210 and 211 mesh with each other when door 13 is in its fully open position. Motor 214 is regulated by suitable interlocks to operate only when the door is open.

The pivotal connection 203 of the secondary arms 193 of the record support arm assemblies to support blocks 204 is a connection which is floating in a direction perpendicular to the elongate extent of the door frame. This connection must be a floating connection since the forward ends of secondary arms 193 must be able to follow the contour of the detenting cams which are associated with each secondary arm 193. Each record support arm assembly has associated with it a 7 inch record positioning detent cam 216 and similar positioning detent cams 217 and 218 which define the 10 inch and 12 inch record supporting positions of secondary arms 193. Cams 216 and 218 are of similar configuration. Cams 216, 217 and 218, as shown in FIG. 14A, are secured to a flange 219 which extends rearwardly from door frame 188 substantially along its entire length. As shown in FIG. 14, detent cams 216 are located adjacent to the center of door 13, whereas cams 217 and 218 are located closer to main arm pivot points 192. Each of the detent cams on the left side of door 13 has associated with it a respective one of switches 220, 221 and 222.

The pivotal connection of each record support secondary arm 193 to its associated support member 204 is defined by a reduced diameter upper end 223 of a pin 224 above the support arm. Pins 223 are carried by arms 193. The major portion of each pin 223 is disposed below the corresponding support arm and at its lower end carries a cam follower roller 225. The extreme forward end of each secondary support arm 193 is supported on a bottom surface 226 of a rearwardly opening recess 227 formed in a rear portion of each support member 204. As shown in FIG. 3, head 223 of each pin 224 cooperates with an upper portion of this recess which is contoured to permit the head to move in the recess only in a direction toward and away from the door frame. Springs 205 urge the respective support arms toward the door frame to maintain the forward ends of the support arms engaged in recesses 227 and to continually urge cam follwer rollers toward door frame flange 219.

Assume that door 13 is in its fully open position and a command is given to the record player, via one of control buttons 33, 34, or 35, to adjust the record player to accept a record of a size different from the last record received. In response to such a command, motor 214 is operated to cause gear 210 to be driven, via flexible shaft 212 and gear 211 which then meshes with gear 210, to rotate screw shafts 207 and 208 in an appropriate direction. Support members 204 are driven toward or away from each other, carrying the inner ends of secondary support arms 193 with them by virtue of the previously described coupling of arms 193 to support members 204. As such motion occurs, cam follower roller 225 follow along cams 218, 217, or 216 until the roller is engaged with the cams associated with the record size which has been selected. Proper registry of the cam rollers with the corresponding detent cams is sensed by that one of switches 220, 221 or 222 which corresponds to the size of the record selected. Upon registry of the cam rollers with the appropriate pair of cam members, the appropriate switch senses this fact and generates a signal which instructs the drive motor to cease its operation. The record support arm assemblies 190 have thereby been adjusted to assume the appropriate configuration for receipt of a record of the size commanded by the operation of the control panel.

From the foregoing description, it is apparent that record player 10 includes means for receiving a record of any size desired, for supporting the record on the openable door of the record player, and for causing a received record to be moved into position in alignment with turntable axis 65 upon closure of the door. By virtue of the overall control system 250, illustrated generally in FIG. 16, door 13 is capable of moving between its open and closed position only when turntable 148 as its lowered position along its axis of rotation. In the course of movement of the turntable from is lowered to its playing position, it passes through the position of a record supported on record support arm assemblies 190 and lifts the record from support points 195 and 206. In the course of moving from its playing position to its retracted position, the turntable replaces a supported record on the record support arm assemblies.

A magnetic head assembly 230 is mounted to top frame 61 by a suitable floating mount so that read and write gaps of the head assembly are positioned over the outer margin of the label area of a record 80 engaged between turntable 148 and clamp disc 159; see FIGS. 3 and 15. Magnetic head assembly 230 is usable with a further aspect of the invention according to which a self-adhesive transparent overlay 231 is affixed concentrically to the label of the record. On the side of the overlay opposite from the layer of pressure-sensitive adhesive carried thereby, overlay 231 carries an annular band of magnetic recording medium 232, i.e., magnetic recording tape. Magnetic head assembly 230 is positioned in the record player to cooperate with medium 232 as the record 80 is rotated about axis 65. Magnetic head assembly 230 is connected to the logic and memory aspect (represented in FIG. 15 at 234) of the control system 250 for the record player.

By the addition of the overlay 231 to an existing record, a user of record player 20 can record directly on the phonograph record information defining a program which, upon insertion of that record into the record player at a later time, commands the record player precisely how that record is to be played. It will be appreciated, of course, that the manufacturer of the record may incorporate a band of magnetic recording material in the outer periphery of the label of the record, and the manufacturer may elect to prerecord on this band information descriptive of the content of that side of the record with which the band is associated. For example, in a record which has multiple selections defined by discrete bands in the information carrying portion of the record groove, the manufacturer may prerecord onto the label information describing the position of the playing stylus at the beginning of each individual band. In any event, the arrangement illustrated in FIGS. 3 and 15 makes it possible for a user of record player 10 to preprogram a given record with specific commands, intelligible by the record player control system 250, describing how that particular record is later to be played. The information recorded on magnetic band 232 may be modified by the user at any time.

The provision of magnetic band 232 on individual records, in cooperation with magnetic head assembly 230, makes it possible to achieve great versatility and flexibility with respect to a user's record library without reliance on a large memory capacity within the record player control system. It will be understood, however, that if a magnetic head assembly 230 is not provided in a record player according to this invention, the record player control system, and particularly the memory aspects thereof, may include a random access memory of sufficient capacity to accept and retain command information for a large number of records; the information peculiar to a specific record can be called up for control of the record player whenever desired by a user.

As shown in FIG. 3, those elements of control panel 14 which have previously been described with reference to FIG. 2 are mounted in a control assembly 240 is located in the right front quadrant of the record player. Assembly 240 is secured along its right edge to top frame 61 by a pair of screws 241, but is hinged along its left edge to the top frame by a hinge assembly 242. When the cover of the record player is opened, in the manner described above, and screws 241 are removed, the entire control panel assembly 240 may be hinged at its left end upwardly relative to the top frame 61 for access. Connections between the various devices carried by control panel assembly 240 to the other electrically operated components of the record player is by way of a flat multiconductor, flexible cable (not shown) which extends from assembly 240, through space 243 between assembly 240 and hinge assembly 242, across the top of top frame 61 to adjacent the left side of the record player, and then downwardly into the lower portions of the interior of the record player. This routing of the flexible cable provides the necessary clear path for movement of a record by door 13 into and out of alignment with turntable axis 65.

Figure 17:
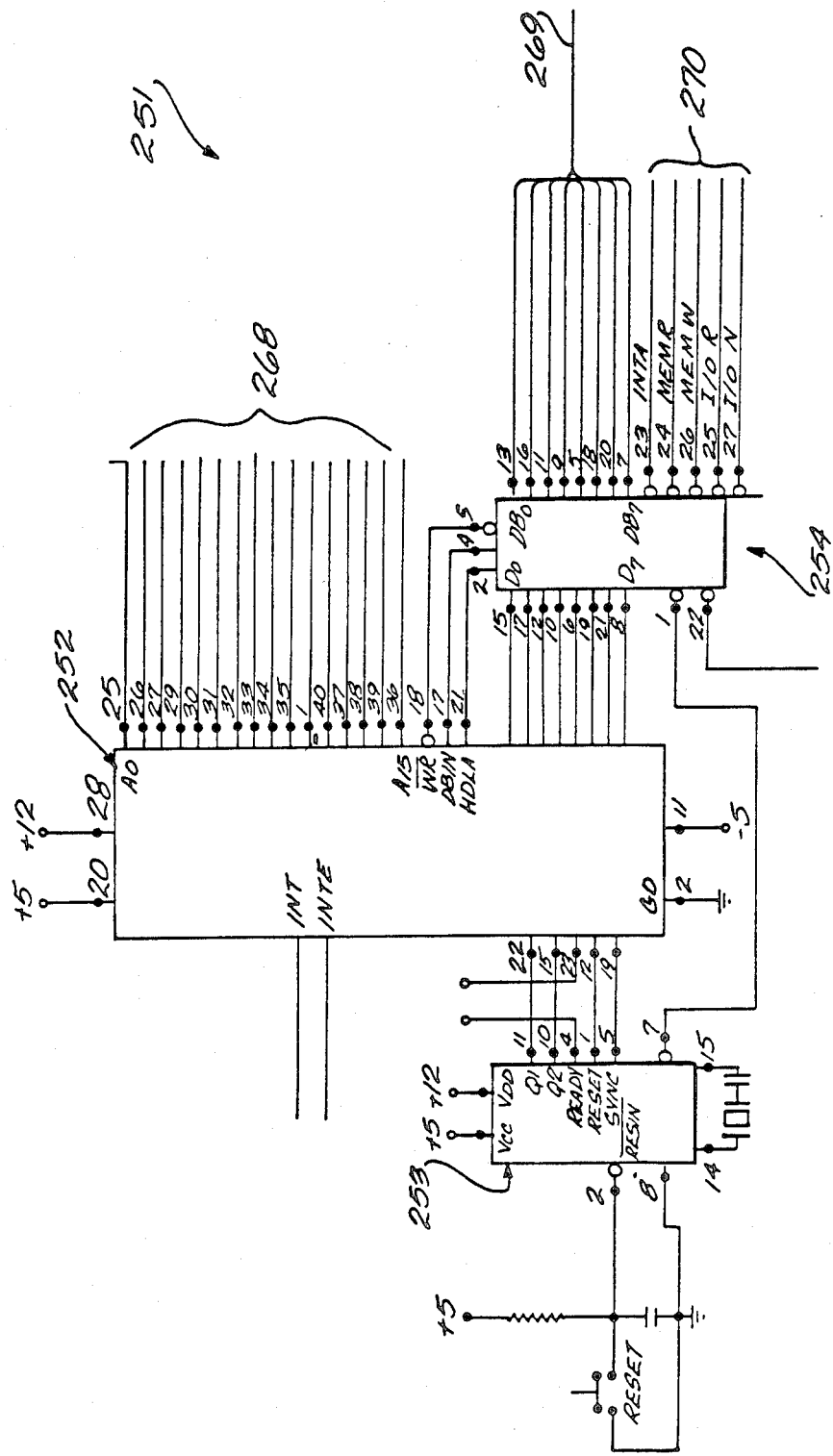
Figure 18:
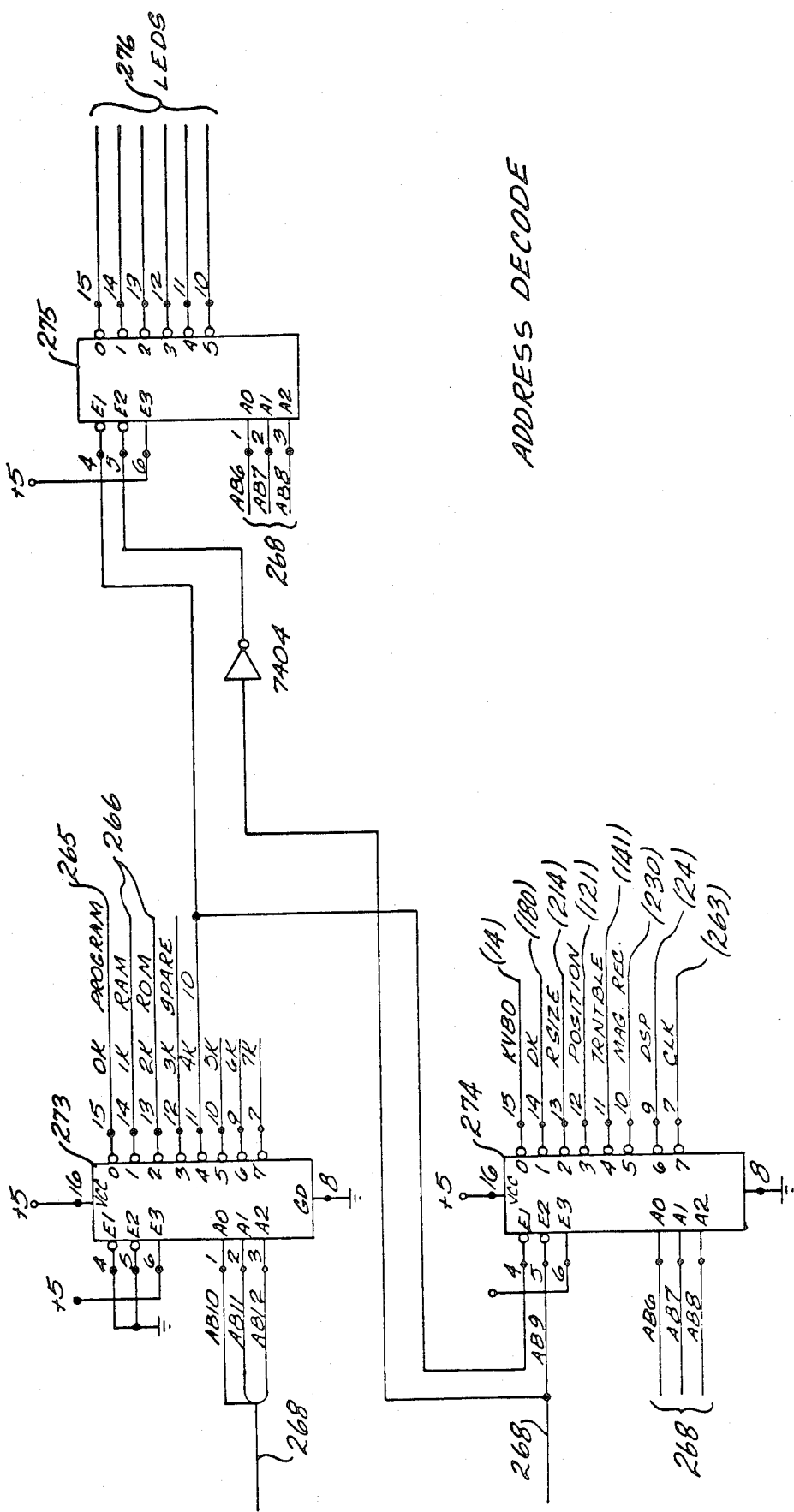
Figure 19:
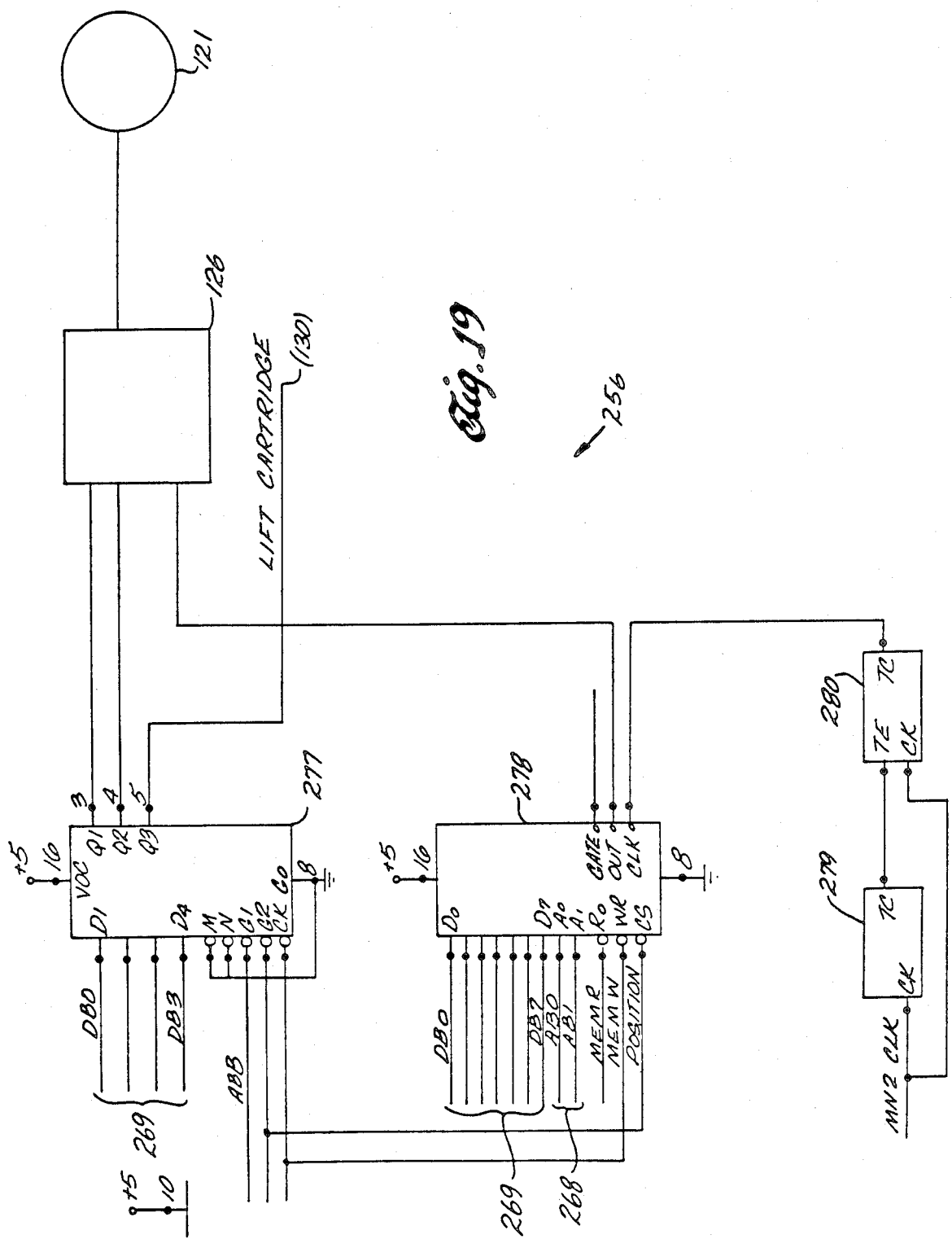

FIG. 16 is a simplified overall block diagram of a programmable control system 250 for record player 10 as described above. FIGS. 17—24 are schematic and logic block diagrams of individual components and subsystems of the overall system shown in FIG. 16, in which:

FIG. 17 pertains to the master control subsystem 251 composed of central processor unit 252, an internal clock module 253, and a control module 254;

FIG. 18 pertains to an address-decode subsystem 255 which is not shown in FIG. 16, but which is intimately associated funcionally with control system 251;

FIG. 19 pertains to the stylus positioning subsystem 256, which includes stepping motor 121 and stylus lift solenoid 130;

FIG. 20 pertains to the keyboard scanning subsystem 257 which is associated with sections 21, 22 and 23 of control panel 14;

FIG. 21 pertains to the door and record size control subsystem 258, which subsystem is represented functionally in FIG. 16 by blocks 259 and 260 associated with drive motors 180 and 210, respectively;

FIG. 22 pertains to display subsystem 261 with which digital display section 24 of control panel 14 is intimately associated;

FIG. 23 pertains to control panel lighting subsystem 262, which is not represented in FIG. 16; and FIG. 24 pertains to a real-time clock subsystem 263. Additionally, overall control system 250, as represented in FIG. 16, includes a turntable control subsystem 264, a read-only memory 265, a random-access memory 266, and magnetic record subsystem with which magnetic head assembly 230 is associated.

The basic element of overall control system 250 is central processor unit 252. Preferably, this unit is defined by an INTEL 8080 microprocessor with which is associated, in a conventional manner, an internal clock circuit module 253 and a control module 254. The control module preferably is an INTEL 8228 integrated circuit which is coupled to the microprocessor in the manner shown in FIG. 17. The central processing unit has associated with it a 16 lead address bus 268. Control module 254 provides an 8 lead data bus 269, and a 5 lead control bus 270 of which 4 leads are active. The address, data and control buses are unified in the representation of FIG. 16 into a bus trunk 271 to which the remaining subsystems of system 250 are appropriately connected as indicated in FIGS. 17-24 or as described below. Internal clock module 253 provides two separate clocking pulse trains which each have a frequency of 2m Hz.

FIG. 18 shows that address-decode subsystem 255 preferably is comprised of three INTEL Type 8205 integrated circuits 273, 274 and 275 to which various leads of address bus 268 are applied for correlation and dedication to other leads associated with the various components and mechanisms of record player 10. The six output leads from circuit 275 are collectively a LED bus 276 which, as shown in FIG. 23, is used to supply signals which control illumination of the light emitting diode providing independent illumination of certain of the buttons in control panel 14. The control subsystems, components and mechanisms of the record player with which the output leads from elements 273, 274 and 275 are associated are represented by the numbers in parentheses in FIG. 18; this parenthetical notation is also used in FIGS. 16 and 19-24.

As shown in FIG. 19, stylus position subsystem 256 includes a register 277 which preferably is defined by a Texas Instruments Type 75L5173 integrated circuit, an interval timer module 278 which preferably is defined by an INTEL Type 8257 integrated circuit, and by two counters 279 and 280 which preferably are Fairchild Semiconductor Type 9316 counters. Register 277 and interval timer 278 are connected to controller 126 associated with stepping motor 121, as described above. Counters 279 and 280 are coupled to the interval timer. Also, the register 277 is connected to stylus lift solenoid 130, as shown in FIG. 19, to provide the previously described interlock between the stylus lift solenoid and stepping motor 121 which is operative during high speed operation of the stepping motor for traversing of cartridge 67.

As noted above, the several pushbuttons in digital input section 22 and computer control section 23 of control panel 14 are wired in 3×4 and 3×3 matrices, respectively. These two matrices are combined into an overall 3×7 matrix which is scanned for decoding and subsequent implementation by control system 250 via keyboard scan subsystem 257. The keyboard scan subsystem 257, as shown in FIG. 20 includes, as principal components thereof, two integrated circuit modules 282 and 283. Module 282 preferably is an INTEL Type 8205 integrated circuit, and module 283 preferably is a Texas Instruments Type 74L5251 integrated circuit.

As shown in FIG. 21, door and record size control subsystem 258 includes three integrated circuits, 285, 286 and 287, which are connected to data bus 269. Integrated circuit 285 preferably is a Fairchild Semiconductor Type 74L5173 integrated circuit which has 2 output leads 288 which are connected to Triacs (semi-conductor switches) associated with drive motor 214 of the record support arm drive mechanism. This integrated circuit has a third output lead 289 which is connected to a Triac for drive motor 180. Motor 214 is a reversible motor, whereas door drive motor 180 operates only in one direction. Integrated circuits 286 and 287 preferably are both INTEL Type 8216 integrated circuits.

The digital display section 24 of control panel 14, as described above, is comprised of four 7-segment light emitting diode units 25 and a 2-element light emitting diode device 26. Devices 25 and 26 may be components of a Litronix Type 4520A light emitting diode assembly. Each of devices 25 has associated with it, as shown in FIG. 22, a driver 290 which preferably is a MOtorola Type MC14551 integrated circuit, to which data bus 269 is connected.

As noted above in the description pertinent to FIG. 2, the 24 pushbuttons in control panel section 20, 21 and 23 are each separately illuminated, either in response to operation thereof, or under control of the basic operational program of the record player defined by read-only memory 265. As shown in FIG. 23, which illustrates the general organization of control panel lighting subsystem 262, the 24 light sources for the illuminated pushbuttons of control panel 14 are light emitting diodes 292. These 24 light emitting diodes are connected in sets of four to the output terminals of six register circuits 293, each of which preferably is a Texas Instruments Type 74L5173 integrated circuit register. Registers 293 are connected to LED bus 276 and to data bus 269, as shown in FIG. 23.

Record player 10 includes a real-time clock module, represented in FIG. 24 at 295. The real-time clock is operable, during periods when power to record player 10 is otherwise shut off, to cause the actual time-of-day to be displayed in hours and minutes and, with flashing colon 26, in seconds in display portion 24 of control panel 14. Preferably the real-time clock 295 includes a Fairchild real-timing clock circuit Type FCM7002 which is connected to data bus 270 via two registers 296 and 297 which provide data and timing information, respectively, to the clock circuit 295. Preferably registers 296 and 297 are comprised by Texas Instruments Type 74L5173 register modules.

Read-only memory 265 and random-access memory 266, shown in FIG. 16, preferably both have a capacity of one thousand words, each word being composed of eight binary bits. Read-only memory 265 is a modifiable standard unit which is specifically modified to define a permanent operational instruction set, both in terms of ultimate function and sequence of function, for record player 10. Thus, read-only memory 265 defines, for example, the interlock between lift solenoid 130 and stepping motor 121 to prevent operation of stepping motor 121 in its high speed mode to traverse cartridge 67 until solenoid 130 has been operated to lift the stylus out of engagement with a record. The read-only memory also determines the order in which the light emitting diodes 292 associated with the pushbuttons of computer control section 23 are illuminated to indicate to a user the procedures which he should follow in instructing the record player for play of a given record. The random-access memory 266, on the other hand, is a location into which data of a transient nature may be accumlated, such as, for example, information peculiar to a given record as read from the record via magnetic head assembly 230, or commands entered by the user into the record player via control panel 14 peculiar to play of a record. The random-access memory may also be used as a data storage bank into which a user may insert playback programs for a number of records in his record library.

It is apparent from an examination of FIGS. 16–24 that record player 10 includes a computerized control system which enables it to perform the various unique, versatile and flexible control functions which were set forth in the foregoing description of the elements of control panel 14.

Certain of the control features described above with reference to record player 10 can be incorporated into existing radial-tracking record players. Such features include, notably, the features of player 10 which enable it to play, in any desired sequence, one or more specified passages or bands of audio information defined in the spiral groove in the outer principal annular portion of a phonograph record. Such adaptation (retrofitting) of an existing radial tracking record player is most usefully accomplished in connection with the use of the self-adhesive, applique-type record label overlay 231, described above, having near its outer margin an annular band of magnetic recording medium 232. FIGS. 25 and 26 illustrate such an adaptation.

As shown in FIG. 25, an existing radial-tracking record player 300 includes a circular turntable 301 which is drivable at a selected angular velocity about a central axis collinear with central short spindle 302 which extends upwardly from the center of the turntable. The turntable is mounted adjacent the upper surface of a support housing 303 which encloses the turntable drive motor and associated mechanisms which are controlled by a group 304 of manually operable keys or buttons located, usually, near a front corner of the housing. Record player 300 also includes a tone arm 305 which, usually, projects forwardly from a support housing 306 which is drivable linearly and reversibly along a guide and support rod 307 disposed along the rear of housing 302. Housing 306 is driven, as desired, along rod 307 by a suitable tone arm drive mechanism located within housing 303. The front end of tone arm 305, the end spaced from housing 306, carries a suitable stylus and transducer assembly 308 which includes a stylus (not shown) which is cooperable in the usual manner with a phonograph record 309 disposed on the turntable.

Record player 300 has the characteristic that when it is operated for play of record 309, the tone arm support housing 306 moves linearly along a line which is so located relative to spindle 302 that the stylus moves along a straight line path oriented radially of record 309;

In FIGS. 25 and 26, record 309 is shown to be provided with a label area overlay 231 having an outer annular band of magnetic recording medium 232.

As shown schematically and in block diagram form in FIG. 26, housing 303 of record player 300 encloses a central processor unit 310 of suitable definition which receives control signals from control keys 304 and which controls the operation of a turntable drive mechanism 311 operativaely coupled to turntable 301 and a tone arm drive and the operation of a stylus position mechanism 312 which is operatively coupled to tone arm support housing 306. An internal clock module 313 may be associated with central processor unit 310.

To adapt (retrofit) record player 300 to have the advanced operational features of this invention noted above, a peripheral (auxiliary) control unit 315, which includes a magnetic read/write wand assembly 316, is coupled to the record player. The wand is coupled to a housing 317 of control unit 315 by a multi-conductor cable 318. The control unit is coupled to record player 300 by a multi-conductor cable 319 and an interface connector 320.

The similarity between the external appearance of peripheral control unit 315, as shown in FIG. 25, and the appearance of the control and operating panel 14 of record player 10, as shown in FIGS. 1 and 2, will be noted. While such similarity of appearance is not critical, such similarity is shown in FIGS. 1, 2 and 25 to emphasize that control unit 315 can and preferably does include essentially all of the manually operable buttons, keys, controls and displays provided in record player 10 with such related circuitry of record player 10 as is pertinent to the operation of record player 300 and is not duplicated in record player 300. Thus, peripheral control unit 315 can and preferably does include in housing 317 a central processor unit 252' similar to unit 252, a control module 254' similar to module 254, a real time clock module 263, a keyboard scanning subsystem 257' similar to subsystem 257, a read-only memory (ROM) 265 and a random access memory 266, a digital-/analog display subsystem 321, and a magnetic record subsystem 230' especially associated with wand 316. Unit 315 may also include an internal clock subsystem 253'.

Central processor unit 252' of peripheral control unit 315 preferably is defined to be compatible with and supportive of central processor unit 310, if any, of record player 300.

The manually operable controls accessible on the exterior of peripheral control unit 315 are functionally the same as those provided in record player 10, and so are not described in detail at this point; the likely exception to this statement is that unit 315 does not include turntable speed fine-adjust control rings 42 and 43 provided in record player 10. It is probable that some of the controls provided in unit 315 will be functionally duplicative of the controls provided in control group 304 of record player 300.

To couple control unit 315 to record player 300 in a retrofit manner, a female connector assembly 323 is mounted to the housing of record player 300 at a desired location; such connector component mates with a male connector assembly 324 to which is connected cable 319 from the peripheral control unit. Within housing 303, the conductors from the added female connector assembly (shown collectively at 325) are connected to the record player central processor unit in place of or in addition to those from control group 304, as desired; such connection is shown generally at 326.

Magnetic read/write wand 316 includes a handle portion 330 and a head portion 331; see FIG. 26. The head portion includes a magnetic read/write head assembly 332 and a spindle sleeve 333 which is rotatably mounted in wand head 331 in a predetermined spaced relation to magnetic head assembly 332. Sleeve 333 has a bore which makes a close fit over spindle 302 in use of the wand, thereby to place the read and write gaps of the wand magnetic head assembly in operative cooperation with the band of magnetic recording medium 232 carried by the label overlay 231 applied to record 309 supported on the turntable of record player 300. Accordingly, by use of wand 316 and peripheral control unit 315, data recorded on record medium 232 can be read via the wand into unit 315 for use in controlling the operation of player 300 to play record 309 in a desired manner, or data similarly descriptive of a desired manner of play of the record can be recorded via wand 316 and unit 315 onto the record's annular band of magnetic recording medium, in effect preprogramming the record for later play in the player in a particular desired manner.

In the foregoing description of peripheral control unit 315, primed numbers (e.g., 252′) have been used to denote functional similarity to correspondingly non-primed-numbered features of record player 10.

It will be appreciated that the tone arm drive and positioning mechanisms of record player 300 are operable to place the stylus carried by the tone arm at any position desired radially of spindle 302 within the range of travel afforded to the tone arm.

Peripheral control unit 315 and wand 316, when defined compatibly with the internal mechanisms of record player 300, adapt the record player to manifest the advanced versatile control and operational features of record player 10. The addition, by retrofit, of unit 315 (with wand 316) to record player 300 enables the owner of a number of records to beneficially use label overlay 231 and its features with his existing records and an existing radial tracking record player.

It will be appreciated that of the many features of record player 10, those of peripheral control unit 315 and those of label overlay 232 can be used to advantage in players for videodiscs and other similar forms of information-bearing discs in addition to phonograph records.

It will be appreciated that the foregoing description has been presented with reference to a presently preferred embodiment of this invention and to certain selected alternative embodiments of certain aspects of this invention. The preceding descriptions have been set forth by way of example, not as an exhaustive treatise or catalog of all forms which this invention may take. Accordingly, workers skilled in the art or arts to which this invention pertains will readily recognize that alterations, variations or modifications on the structures, arrangements and systems described above may be made without departing from the scope of this invention, and that the following claims are not to be interpreted as pertaining only to the specific arrangements, structures and procedures described above.

What is claimed is:

1. The combination of a programmable record and a cooperatively arranged record player in which the record, when programmed, provides instructions to the record player for commanding the record player to play back the record in a programmed sequence, the record player comprising a read/write head for creating programming instructions on the record and for receiving the programming instructions from the record, a transducing means cooperable with the record for playback of primary information contained by the record apart from the programming instructions, and a logic/memory means for receiving the programming instructions from the read/write head and for directing the operation of the transducing means, the record also comprising an outer annular region and a central annular region, the outer region containing primary information that is transducible by the transducing means on the record player, the central region comprising machine readable means cooperable with the read/write head for receiving and storing the programming instructions, such instructions being descriptive of the location on the outer annular region of a least one discrete portion of the primary information.

2. The combination according to claim 1 wherein the machine readable means comprises an annular band of magnetic recording medium on a label on the central portion of the record.

3. The combination according to claim 2 wherein the machine readable means is contained on a transparent overlay which is affixed to the record label.

4. The combination according to claim 1 wherein the primary information when transduced by the record player comprises audio.

* * * * *